(12) United States Patent
Xu et al.

(10) Patent No.: US 11,862,143 B2
(45) Date of Patent: Jan. 2, 2024

(54) SYSTEMS AND METHODS FOR PROCESSING SPEECH DIALOGUES

(71) Applicant: BEIJING DIDI INFINITY TECHNOLOGY AND DEVELOPMENT CO., LTD., Beijing (CN)

(72) Inventors: Haiyang Xu, Beijing (CN); Kun Han, Mountain View, CA (US)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 733 days.

(21) Appl. No.: 16/996,961

(22) Filed: Aug. 19, 2020

(65) Prior Publication Data

US 2022/0028371 A1 Jan. 27, 2022

(30) Foreign Application Priority Data

Jul. 27, 2020 (CN) .......................... 202010731224.5

(51) Int. Cl.
*G10L 15/00* (2013.01)
*G10L 15/06* (2013.01)
(Continued)

(52) U.S. Cl.
CPC ............ *G10L 15/063* (2013.01); *G06F 18/24* (2023.01); *G06F 40/253* (2020.01); *G10L 15/02* (2013.01);
(Continued)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 9,558,265 B1 1/2017 Tacchi et al.

FOREIGN PATENT DOCUMENTS

CN 108320738 A 7/2018
CN 108597519 A 9/2018
(Continued)

OTHER PUBLICATIONS

Xu Haiyang et al., ASR-Robust Pre-training Model for Spoken Dialogue Classification, SIGIR '20: The 43rd International ACM SIGIR Conference on Research and Development in Information Retrieval, 2020, 4 pages.
(Continued)

*Primary Examiner* — Vu B Hang
(74) *Attorney, Agent, or Firm* — METIS IP LLC

(57) ABSTRACT

The present disclosure is related to systems and methods for processing speech dialogue. The method includes obtaining target speech dialogue data. The method includes obtaining a text vector representation sequence, a phonetic symbol vector representation sequence, and a role vector representation sequence by performing a vector transformation on the target speech dialogue data based on a text embedding model, a phonetic symbol embedding model, and a role embedding model, respectively. The method includes determining a representation vector corresponding to the target speech dialogue data by inputting the text vector representation sequence, the phonetic symbol vector representation sequence, and the role vector representation sequence into a trained speech dialogue coding model. The method includes
(Continued)

determining a summary of the target speech dialogue data by inputting the representation vector into a classification model.

20 Claims, 10 Drawing Sheets

(51) Int. Cl.
  *G06F 40/253*    (2020.01)
  *G10L 15/02*    (2006.01)
  *G10L 15/22*    (2006.01)
  *G06F 18/24*    (2023.01)
(52) U.S. Cl.
  CPC ........ *G10L 15/22* (2013.01); *G10L 2015/025* (2013.01); *G10L 2015/223* (2013.01)
(58) Field of Classification Search
  CPC ....... G10L 15/063; G10L 25/78; G10L 25/87; G10L 19/00; G10L 19/005; G10L 15/16; G10L 25/30; G10L 15/08; G10L 15/1822; G10L 15/183; G10L 15/19; G10L 15/193; G10L 15/187; G10L 2015/0631
  See application file for complete search history.

(56) References Cited

FOREIGN PATENT DOCUMENTS

| | | |
|---|---|---|
| CN | 109657051 A | 4/2019 |
| CN | 109670035 A | 4/2019 |
| CN | 110704586 A | 1/2020 |
| CN | 110751945 A | 2/2020 |
| CN | 111177324 A | 5/2020 |
| CN | 111192572 A | 5/2020 |
| CN | 111382228 A | 7/2020 |
| CN | 111400450 A | 7/2020 |

OTHER PUBLICATIONS

Audior, Speech Recognition—Chinese Speech Recognition System Framework Based on Deep Learning, Chinese Software Developer Network, 2018, 21 pages.

Sun Jiasong et al., Improving the Soundness of Speech Recognition System by Using Tunable Pinyin Model, China Academic Journal Electronic Publishing House, 2003, 5 pages.

Huang Yi, Based on Intelligent Voice Analysis Customer Service Smart Operation Management System Solution, Public Communication of Science & Technology, 10(3): 121-123, 161, 2018.

SYSTEMS AND METHODS FOR PROCESSING SPEECH DIALOGUES

CROSS-REFERENCE TO RELATED APPLICATIONS

This application claims priority of Chinese Patent Application No. 202010731224.5 filed on Jul. 27, 2020, the contents of which are hereby incorporated by reference.

TECHNICAL FIELD

The present disclosure generally relates to the field of data processing, and in particular, to systems and methods for processing speech dialogues.

BACKGROUND

With the development of artificial intelligence, a speech recognition technology is widely used in various fields, for example, a home automation, a smart customer service. The core of speech interaction is how a machine correctly understands a user's intention and make a correct response to help the user solve a problem quickly and accurately. However, with the gradual expansion of application scenarios, it is difficult to guarantee the speech recognition performance in complex application scenarios. Thus, it is desirable to provide systems and methods for processing speech dialogue to improve the accuracy of semantic understanding.

SUMMARY

According to an aspect of the present disclosure, a method for processing speech dialogue may be implemented on a computing device having one or more processors and one or more storage devices. The method may include obtaining target speech dialogue data. The method may include obtaining a text vector representation sequence, a phonetic symbol vector representation sequence, and a role vector representation sequence by performing a vector transformation on the target speech dialogue data based on a text embedding model, a phonetic symbol embedding model, and a role embedding model, respectively. The method may include determining a representation vector corresponding to the target speech dialogue data by inputting the text vector representation sequence, the phonetic symbol vector representation sequence, and the role vector representation sequence into a trained speech dialogue coding model. The method may include determining a summary of the target speech dialogue data by inputting the representation vector into a classification model.

In some embodiments, the method may include obtaining a sentence text of the summary of the target speech dialogue data. The method may include performing a grammatical correction operation on the sentence text.

In some embodiments, the text embedding model may include at least one of a word embedding sub-model configured to determine a word vector representation sequence of the target speech dialogue data, a position embedding sub-model configured to determine a position vector representation sequence of the target speech dialogue data, and a paragraph embedding sub-model configured to determine a paragraph vector representation sequence of the target speech dialogue data.

In some embodiments, the method may include obtaining at least one of a dialect vector representation sequence, an emotion vector representation sequence, or a background text vector representation sequence corresponding to the target speech dialogue data. The dialect vector representation sequence may be determined by performing a vector transformation on the target speech dialogue data based on a dialect embedding model. The emotion vector representation sequence may be determined by performing a vector transformation on the target speech dialogue data based on an emotion embedding model. The background text vector representation sequence may be determined by performing a vector transformation on a background text of the target speech dialogue data based on a background text embedding model. The method may include determining the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model.

In some embodiments, the speech dialogue coding model may be determined according to a training process. The training process may include obtaining sample speech dialogue data. The training process may include obtaining a text vector representation sequence, a phonetic symbol vector representation sequence, and a role vector representation sequence by performing a vector transformation on the sample speech dialogue data based on a text embedding model, a phonetic symbol embedding model, and a role embedding model, respectively. The training process may include obtaining a pre-trained speech dialogue coding model by pre-training the speech dialogue coding model in a self-supervised learning manner based on the text vector representation sequence, the phonetic symbol vector representation sequence, and the role vector representation sequence.

In some embodiments, the training process may include jointly pre-training the speech dialogue coding model and at least one of the text embedding model, the phonetic symbol embedding model, or the role embedding model.

In some embodiments, the training process may include designating at least portion of at least one of the text vector representation sequence, the phonetic symbol vector representation sequence, or the role vector representation sequence as an annotation, the annotation including at least portion of elements in the role vector representation sequence.

In some embodiments, the annotation may further include one or more keywords in the text vector representation sequence.

In some embodiments, the annotation may further include an order of sentences embodied in the text vector representation sequence.

In some embodiments, the training process may include obtaining at least one of a dialect vector representation sequence, an emotion vector representation sequence, or a background text vector representation sequence corresponding to the sample speech dialogue data. The dialect vector representation sequence may be determined by performing a vector transformation on the sample speech dialogue data based on a dialect embedding model. The emotion vector representation sequence may be determined by performing a vector transformation on the sample speech dialogue data based on an emotion embedding model. The background text vector representation sequence may be determined by performing a vector transformation on a background text of the sample speech dialogue data based on a background text embedding model. The training process may include obtaining the pre-trained speech dialogue coding model by pre-training the speech dialogue coding model in the self-supervised learning manner based on the text vector representation sequence, the phonetic symbol vector representation sequence, the role vector representation sequence, and at least one of the dialect vector representation sequence, the emotion vector representation sequence, or the background text vector representation sequence.

According to another aspect of the present disclosure, a system for processing speech dialogue may include at least one storage device storing a set of instructions, and at least one processor in communication with the at least one storage device. When executing the set of instructions, the at least one processor may be directed to cause the system to obtain target speech dialogue data. The at least one processor may be directed to cause the system to obtain a text vector representation sequence, a phonetic symbol vector representation sequence, and a role vector representation sequence by performing a vector transformation on the target speech dialogue data based on a text embedding model, a phonetic symbol embedding model, and a role embedding model, respectively. The at least one processor may be directed to cause the system to determine a representation vector corresponding to the target speech dialogue data by inputting the text vector representation sequence, the phonetic symbol vector representation sequence, and the role vector representation sequence into a trained speech dialogue coding model. The at least one processor may be directed to cause the system to determine a summary of the target speech dialogue data by inputting the representation vector into a classification model.

In some embodiments, the at least one processor may be further directed to cause the system to obtain a sentence text of the summary of the target speech dialogue data. The at least one processor may be directed to cause the system to perform a grammatical correction operation on the sentence text.

In some embodiments, the text embedding model may include at least one of a word embedding sub-model configured to determine a word vector representation sequence of the target speech dialogue data, a position embedding sub-model configured to determine a position vector representation sequence of the target speech dialogue data, and a paragraph embedding sub-model configured to determine a paragraph vector representation sequence of the target speech dialogue data.

In some embodiments, the at least one processor may be further directed to cause the system to obtain at least one of a dialect vector representation sequence, an emotion vector representation sequence, or a background text vector representation sequence corresponding to the target speech dialogue data. The dialect vector representation sequence may be determined by performing a vector transformation on the target speech dialogue data based on a dialect embedding model. The emotion vector representation sequence may be determined by performing a vector transformation on the target speech dialogue data based on an emotion embedding model. The background text vector representation sequence may be determined by performing a vector transformation on a background text of the target speech dialogue data based on a background text embedding model. The at least one processor may be further directed to cause the system to determine the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model.

In some embodiments, the speech dialogue coding model may be determined according to a training process. The training process may include obtaining sample speech dialogue data; obtaining a text vector representation sequence, a phonetic symbol vector representation sequence, and a role vector representation sequence by performing a vector transformation on the sample speech dialogue data based on a text embedding model, a phonetic symbol embedding model, and a role embedding model, respectively; and obtaining a pre-trained speech dialogue coding model by pre-training the speech dialogue coding model in a self-supervised learning manner based on the text vector representation sequence, the phonetic symbol vector representation sequence, and the role vector representation sequence.

In some embodiments, the training process may further include jointly pre-training the speech dialogue coding model and at least one of the text embedding model, the phonetic symbol embedding model, or the role embedding model.

In some embodiments, the training process may further include designating at least portion of at least one of the text vector representation sequence, the phonetic symbol vector representation sequence, or the role vector representation sequence as an annotation, the annotation including at least portion of elements in the role vector representation sequence.

In some embodiments, the annotation may further include one or more keywords in the text vector representation sequence.

In some embodiments, the annotation may further include an order of sentences embodied in the text vector representation sequence.

According to still another aspect of the present disclosure, a non-transitory computer readable medium may include at least one set of instructions. When executed by at least one processor of a computing device, the at least one set of instructions may cause the at least one processor to effectuate a method. The method may include obtaining target speech dialogue data. The method may include obtaining a text vector representation sequence, a phonetic symbol vector representation sequence, and a role vector representation sequence by performing a vector transformation on the target speech dialogue data based on a text embedding model, a phonetic symbol embedding model, and a role embedding model, respectively. The method may include determining a representation vector corresponding to the target speech dialogue data by inputting the text vector representation sequence, the phonetic symbol vector representation sequence, and the role vector representation sequence into a trained speech dialogue coding model. The method may include determining a summary of the target speech dialogue data by inputting the representation vector into a classification model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
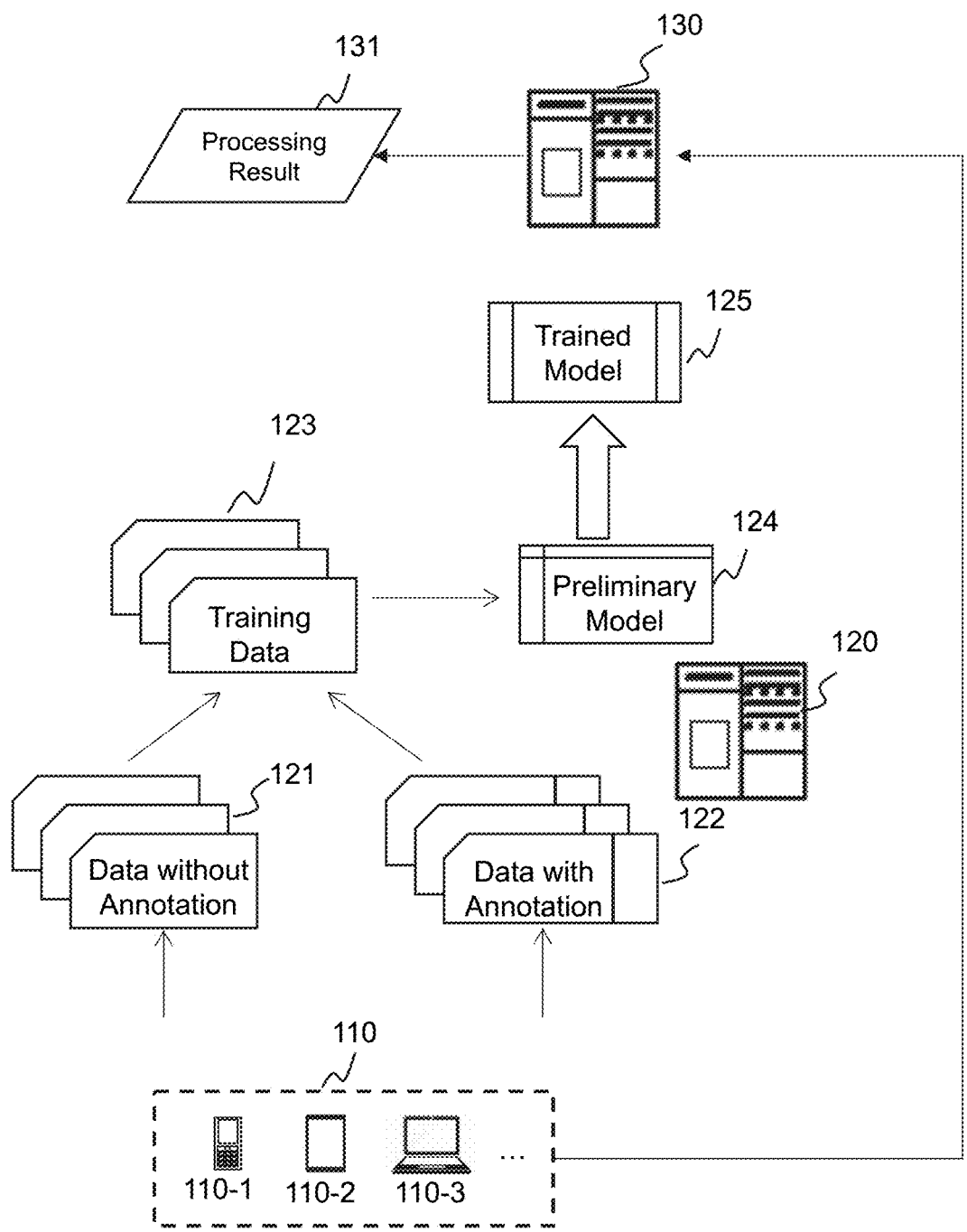
FIG. 1 is a schematic diagram of an exemplary speech dialogue processing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, section, or assembly of different level in ascending order. However, the terms may be displaced by another expression if they achieve the same purpose.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

The embodiments of the present disclosure can be applied to different transportation systems, for example, a taxi, a special car, a ride-hailing car, a bus, a designated driving, etc. The terms "passenger," "requester," "requestor," "service requester," "service requestor," and "customer" in the present disclosure are used interchangeably to refer to an individual, an entity, or a tool that may request or order a service. Also, the terms "driver," "provider," and "service provider" in the present disclosure are used interchangeably to refer to an individual, an entity, or a tool that may provide a service or facilitate the providing of the service. The term "user" may refer to an individual, an entity or a tool that may request a service, order a service, provide a service, or facilitate the providing of the service.

The terms "service request," "request for a service," "request," and "order" in the present disclosure are used interchangeably to refer to a request that may be initiated by a passenger, a service requester, a customer, a driver, a provider, a service provider, or the like, or any combination thereof. The service request may be accepted by any one of a passenger, a service requester, a customer, a driver, a provider, or a service provider. The service request may be chargeable or free.

The terms "service provider terminal," "terminal of a service provider," "provider terminal," and "driver terminal" in the present disclosure are used interchangeably to refer to a mobile terminal that is used by a service provider to provide a service or facilitate the providing of the service. The terms "service requester terminal," "terminal of a service requester," "requester terminal," and "passenger terminal" in the present disclosure are used interchangeably to refer to a mobile terminal that is used by a service requester to request or order a service.

An aspect of the present disclosure relates to systems and methods for processing speech dialogue. According to some systems and methods of the present disclosure, a processing device may obtain target speech dialogue data. The processing device may obtain a text vector representation sequence, a phonetic symbol vector representation sequence, and a role vector representation sequence by performing a vector transformation on the target speech dialogue data based on a text embedding model, a phonetic symbol embedding model, and a role embedding model, respectively. The processing device may determine a representation vector corresponding to the target speech dialogue data by inputting the text vector representation sequence, the phonetic symbol vector representation sequence, and the role vector representation sequence into a trained speech dialogue coding model. The processing device may determine a summary of the target speech dialogue data by inputting the representation vector into a classification model.

According to the present disclosure, by merging text information, phonetic symbol information, and role information of target speech dialogue data, the accuracy of semantic understanding of the target speech dialogue data can be improved. In addition, a representation vector corresponding to the target speech dialogue data may be determined based on a trained speech dialogue coding model and a summary of the target speech dialogue data may be determined based on the representation vector according to a classification model, which can improve the accuracy of speech dialogue data processing.

FIG. 1 is a schematic diagram of an exemplary speech dialogue processing system according to some embodiments of the present disclosure. The speech dialogue processing system 100 may be applied to various scenarios, for example, an intelligent customer service, a robot judgment, etc. Take an online transportation service scenario as an example, if a service disagreement occurs between a driver and a passenger, the speech dialogue processing system 100 may generate a processing result by processing a speech dialogue between the driver and the passenger and judge the responsibility of the driver and/or the passenger based on the processing result. In some embodiments, as shown in FIG. 1, the speech dialogue processing system 100 may include a user terminal 110, a first processing device 120, and a second processing device 130.

The user terminal 110 may be a device for a user to request or provide an online to offline service. The online-to-offline service may include a transportation service (e.g., a taxi service), a shopping service, a meal ordering service, a courier service, etc. The user may use the user terminal 110 to send a speech request or conduct a speech dialogue with other users. For example, take a transportation service scenario as an example, the user terminal 110 may include a driver terminal and a passenger terminal, and a driver and a passenger may conduct a speech dialogue via the driver terminal and the passenger terminal respectively to communicate service contents (e.g., a pickup location, a departure time).

In some embodiments, the user terminal 110 may include a mobile device 110-1, a tablet computer 110-2, a laptop computer 110-3, or the like, or any combination thereof. In some embodiments, the mobile device 110-1 may include a smart home device, a wearable device, a smart mobile device, a virtual reality device, an augmented reality device, or the like, or any combination thereof. The smart home device may include a smart lighting device, a control device of an intelligent electrical apparatus, a smart monitoring device, a smart television, a smart video camera, an interphone, or the like, or any combination thereof. The wearable device may include a bracelet, footgear, glasses, a helmet, a watch, clothing, a backpack, a smart accessory, or the like, or any combination thereof. The smart mobile device may include a mobile phone, a personal digital assistance (PDA), a gaming device, a navigation device, a point of sale (POS) device, a laptop, a desktop, or the like, or any combination thereof. The virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc.

The first processing device 120 and the second processing device 130 may process information and/or data to perform one or more functions described in the present disclosure. In some embodiments, the first processing device 120 and the second processing device 130 may be any devices with data processing capabilities, such as a processor, a server, etc. In some embodiments, the first processing device 120 and the second processing device 130 may be a same processing device or different processing devices. In some embodiments, the first processing device 120 and/or the second processing device 130 may include one or more processing engines (e.g., single-core processing engine(s) or multi-core processor(s)). Merely by way of example, the first processing device 120 and/or the second processing device 130 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the first processing device 120 and/or the second processing device 130 may include a storage device configured to store data and/or instructions. In some embodiments, the storage device may include a mass storage, a removable storage, a volatile read-and-write memory, a read-only memory (ROM), or the like, or any combination thereof. In some embodiments, the first processing device 120 and/or the second processing device 130 may include a data bus, a communication interface, etc. for an internal connection and/or an external connection. In some embodiments, the first processing device 120 and/or the second processing device 130 may include an input device (e.g., a keyboard, a mouse, a microphones), an output device (e.g., a display, a player), etc. In some embodiments, the first processing device 120 and/or the second processing device 130 may be integrated in a same processing device. In some embodiments, the first processing device 120 and/or the second processing device 130 may be executed on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the first processing device 120 may train a speech dialogue coding model based on sample speech dialogue data. Specifically, the first processing device 120 may obtain training data 123 and determine a trained model 125 (e.g., a trained speech dialogue coding model) by training a preliminary model 124 (e.g., a preliminary speech dialogue coding model) based on the training data 123. The training data 123 may be historical speech dialogue data (e.g., historical speech dialogue data between drivers and passengers) among users involved in online to offline services. In some embodiments, the first processing device 120 may obtain the training data 123 from the user terminal 110 or a storage device (not shown in FIG. 1). In some embodiments, the training data 123 may include data without annotation 121 and data with annotation 122 (e.g., historical speech dialogue data with annotation). In some embodiments, the annotation may be a summary of the historical speech dialogue data. In some embodiments, the annotation may be a classification result of the historical speech dialogue data. For example, take a transportation service scenario as an example, if there is a service disagreement between a driver and a passenger, a responsibility judgment may be made for the service disagreement, and the annotation may be a result of the responsibility judgment (e.g., "driver responsibility," "passenger responsibility," "both the driver and the passenger has no responsibility," "responsibility cannot be judged"). More descriptions regarding training the preliminary model may be found elsewhere in the present disclosure (e.g., FIGS. 2-4 and descriptions thereof).

In some embodiments, the second processing device 130 may obtain target speech dialogue data and determine a processing result (e.g., a summary, an intention classification) of the target speech dialogue data based on the trained speech dialogue coding model. Specifically, the second processing device 130 may obtain the target speech dialogue data (e.g., a speech dialogue between a driver and a passenger) from the user terminal 110 or a storage device (not shown in FIG. 1) and determine a representation vector of the target speech dialogue data based on the trained model 125. Further, the second processing device 130 may input the representation vector to a classification model and determine a processing result 131 of the target speech dialogue data based on the classification model. More descriptions regarding determining the processing result of the target speech dialogue data may be found elsewhere in the present disclosure (e.g., FIGS. 5, 6A, 6B, and descriptions thereof).

In some embodiments, the speech dialogue processing system 100 may include a network (not shown in FIG. 1) to facilitate the exchange of data and/or information between various components. In some embodiments, the network may be any type of wired or wireless network, or a combination thereof. Merely by way of example, the network may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof.

It should be noted that the speech dialogue processing system 100 is merely provided for the purposes of illustration, and is not intended to limit the scope of the present disclosure. For persons having ordinary skills in the art, multiple variations or modifications may be made under the teachings of the present disclosure. For example, the speech dialogue processing system 100 may further include a database, an information source, etc. As another example, the speech dialogue processing system 100 may be implemented on other devices to realize similar or different functions. However, those variations and modifications do not depart from the scope of the present disclosure.

Figure 2:
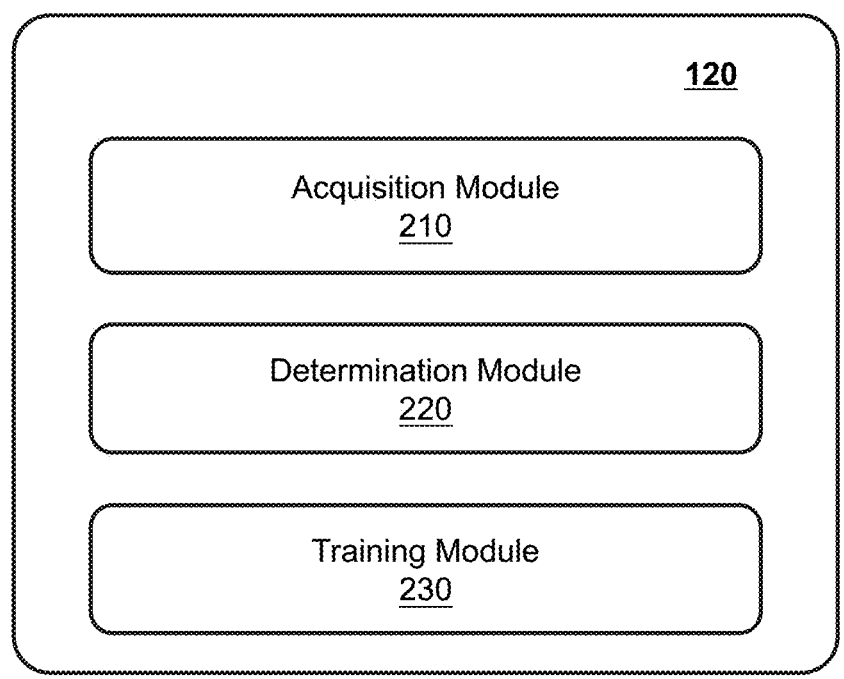
FIG. 2 is a block diagram illustrating an exemplary first processing device according to some embodiments of the present disclosure.

FIG. 2 is a block diagram illustrating an exemplary first processing device according to some embodiments of the present disclosure. In some embodiments, the first processing device 120 may include an acquisition module 210, a determination module 220, and a training module 230.

The acquisition module 210 may obtain sample speech dialogue data. In some embodiments, the acquisition module 210 may obtain sample speech dialogue data from one or more components (e.g., the user terminal 110) of the speech dialogue processing system 100 or an external storage device. More descriptions for obtaining the sample speech dialogue data may be found elsewhere in the present disclosure (e.g., FIGS. 3A, 3B, and descriptions thereof).

The determination module 220 may obtain a text vector representation sequence, a phonetic symbol vector representation sequence, and a role vector representation sequence by performing a vector transformation on sample speech dialogue data based on a text embedding model, a phonetic symbol embedding model, and a role embedding model, respectively. The determination module 220 may obtain at least one of a dialect vector representation sequence, an emotion vector representation sequence, or a background text vector representation sequence corresponding to the sample speech dialogue data. The dialect vector representation sequence may be determined by performing a vector transformation on the sample speech dialogue data based on a dialect embedding model. The emotion vector representation sequence may be determined by performing a vector transformation on the sample speech dialogue data based on an emotion embedding model. The background text vector representation sequence may be determined by performing a vector transformation on a background text of the sample speech dialogue data based on a background text embedding model. More descriptions for obtaining the text vector representation sequence, the phonetic symbol vector representation sequence, the role vector representation sequence, the dialect vector representation sequence, the emotion vector representation sequence, the background text vector representation sequence may be found elsewhere in the present disclosure (e.g., FIGS. 3A, 3B, and descriptions thereof).

The training module 230 may obtain a pre-trained speech dialogue coding model by pre-training a speech dialogue coding model in a self-supervised learning manner based on a text vector representation sequence, a phonetic symbol vector representation sequence, and a role vector representation sequence. The training module 230 may obtain a pre-trained speech dialogue coding model by pre-training a speech dialogue coding model in a self-supervised learning manner based on a text vector representation sequence, a phonetic symbol vector representation sequence, a role vector representation sequence, and at least one of a dialect vector representation sequence, a emotion vector representation sequence, and a background text vector representation sequence. More descriptions for obtaining the pre-trained speech dialogue coding model may be found elsewhere in the present disclosure (e.g., FIGS. 3A, 3B, and descriptions thereof).

It should be noted that the first processing device 120 may be implemented in various ways, for example, implemented by hardware, software, or a combination of the software and the hardware. The hardware may be implemented by using dedicated logic. The software may be stored in a memory, and implemented by a microprocessor or dedicated design hardware. For persons having ordinary skills in the art, it should be understood that the first processing device 120 and the modules may be implemented by using a computer-executable instruction and/or a control code included in a processor. For example, a code may be provided on a carrier medium such as a disk, a CD or a DVD-ROM, a programmable memory such as a read-only memory (e.g., a firmware), or a data carrier such as an optical or electronic signal carrier. The first processing device 120 and the modules may not only be implemented by a hardware circuit, such as a super-large-scale integration, a gate array, a semiconductor such as a logic chip and a transistor, or a programmable hardware device such as a field-programmable gate array and a programmable logic device, etc., it may also be implemented by software executed by various types of processors, or a combination of the hardware circuit and the software (e.g., a firmware).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the acquisition module 210 and the determination module 220 may be integrated into a single module. As another example, each module of the first processing device 120 may share a single storage module, or each module of the first processing device 120 may include a corresponding storage unit.

Figure 3A:
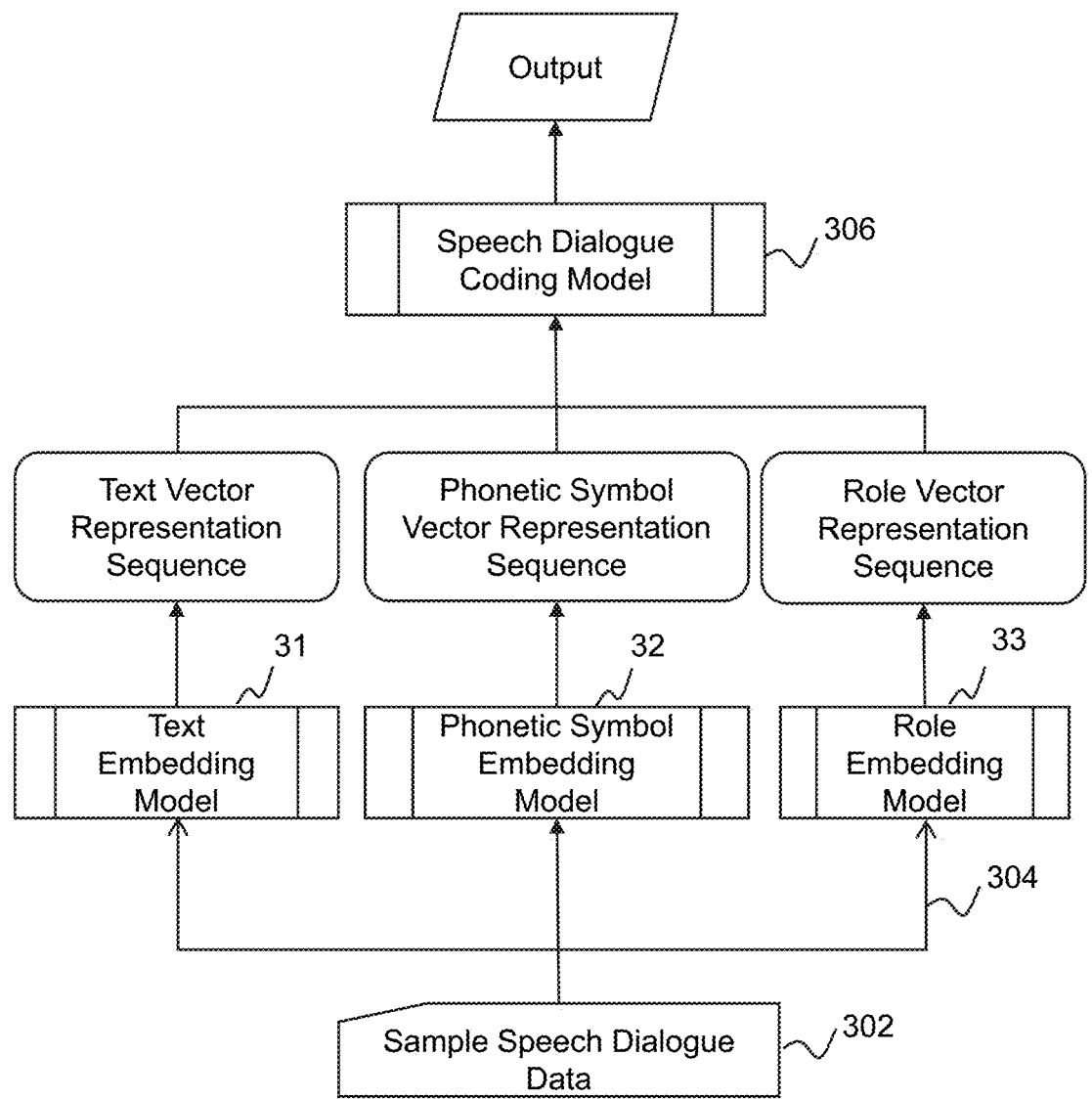
FIG. 3A is a schematic diagram illustrating an exemplary process for training a speech dialogue coding model according to some embodiments of the present disclosure.
Figure 3B:
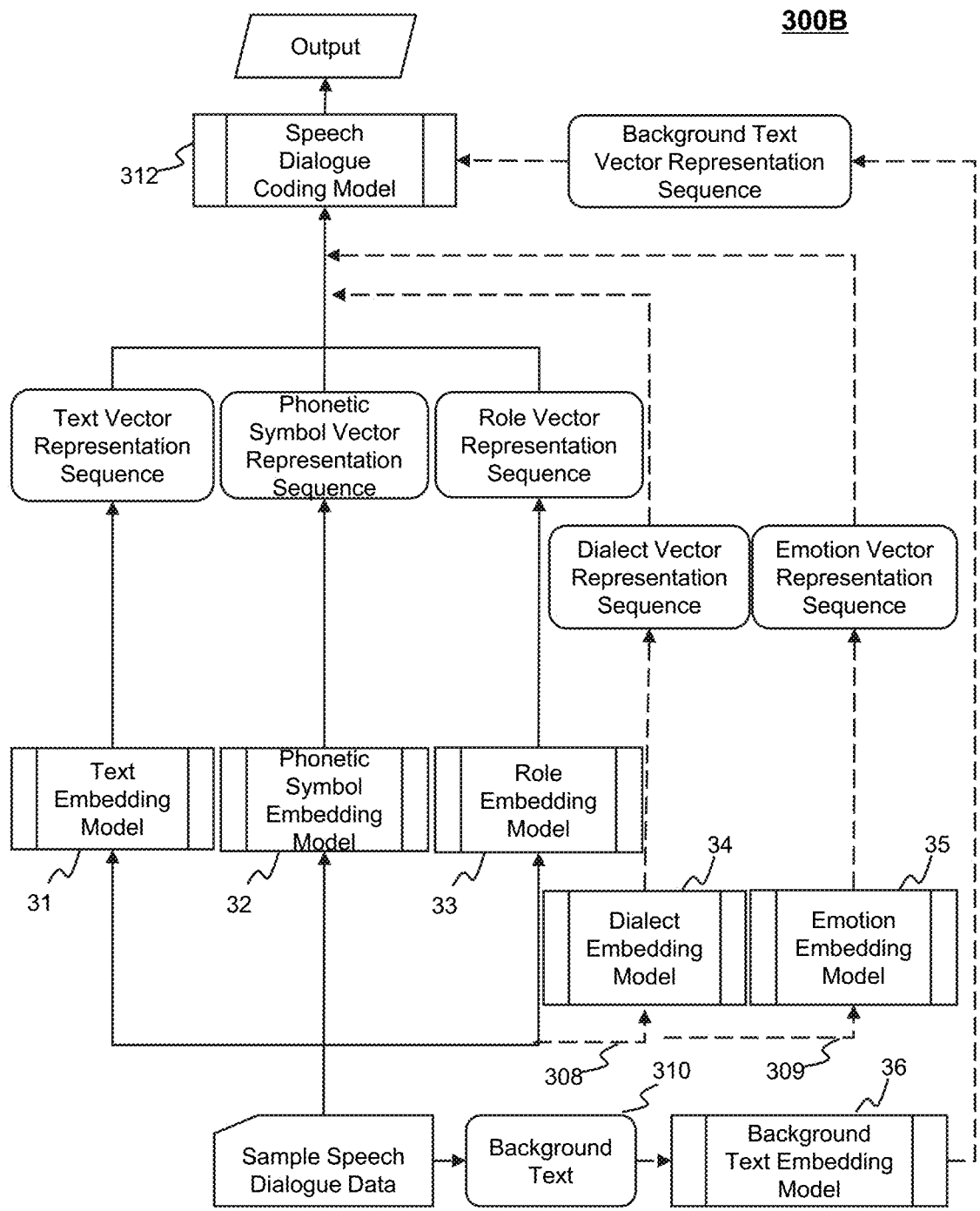
FIG. 3B is a schematic diagram illustrating an exemplary process for training a speech dialogue coding model according to some embodiments of the present disclosure.

FIG. 3A is a schematic diagram illustrating an exemplary process for training a speech dialogue coding model according to some embodiments of the present disclosure. FIG. 3B is a schematic diagram illustrating an exemplary process for training a speech dialogue coding model according to some embodiments of the present disclosure. The process 300A and/or the process 300B may be executed by the speech dialogue processing system 100. For example, the process 300A and/or the process 300B may be stored in a storage device (e.g., a ROM 730, a RAM 740, a storage 890) as a form of instructions, and invoked and/or executed by a processing device (e.g., the first processing device 120, a processor 720 of a computing device 700 illustrated in FIG. 7, a CPU 840 of a mobile device 800 illustrated in FIG. 8, one or more modules shown in FIG. 2). The operations of the illustrated process presented below are intended to be illustrative. In some embodiments, the process 300A and/or the process 300B may be accomplished with one or more additional operations not described and/or without one or more of the operations discussed. Additionally, the order in which the operations of the process 300A as illustrated in FIG. 3A and/or the process 300B as illustrated in FIG. 3B and described below is not intended to be limiting.

In 302, the first processing device 120 (e.g., the acquisition module 210) may obtain sample speech dialogue data.

The sample speech dialogue data may be historical dialogue data among users. For example, in a transportation service scenario, the sample speech dialogue data may include historical speech dialogue data between drivers and passengers, historical speech dialogue data between drivers (or passengers) and customer service staffs, etc. As another example, in a shopping service scenario, the sample speech dialogue data may include historical speech dialogue data between customers and online shopping service staffs. As still another example, in a daily life scenario, the sample speech dialogue data may be historical speech dialogue data among friends, speech dialogue data among relatives, etc.

In some embodiments, the sample speech dialogue data may be in any form (e.g., a voice form, a video form, a picture form, a text form). For example, a voice collection mode may be activated on the user terminal(s) 110 to obtain voice speech dialogue data from users, which may be further used as sample speech dialogue data. As another example, a text input mode may be activated on the user terminal(s) 110 to obtain text speech dialogue data, which may be further used as sample speech dialogue data.

In some embodiments, the first processing device 120 may obtain the sample speech dialogue data from one or more components (e.g., the user terminal 110, a storage device) of the speech dialogue processing system 100 or an external storage device. For example, in a transportation service scenario, the user terminal 110 may record speech dialogue data between a passenger and a driver in real-time and store the speech dialogue data in a storage device of the speech dialogue processing system 100 or an external storage device. Accordingly, the first processing device 120 may obtain the speech dialogue data (i.e., the sample speech dialogue data) from the storage device, the user terminal 110, or the external storage device.

In 304, the first processing device 120 (e.g., the determination module 220) may obtain a text vector representation sequence, a phonetic symbol vector representation sequence, and a role vector representation sequence by performing a vector transformation on the sample speech dialogue data based on a text embedding model, a phonetic symbol embedding model, and a role embedding model, respectively. As used herein, a vector representation sequence may refer to a sequence including a set of vectors in a vector space.

In some embodiments, the sample speech dialogue data may correspond to a dialogue text including one or more words (or phrases) and/or one or more paragraphs. Accordingly, the text vector representation sequence may refer to a vector representation sequence determined by performing a vector transformation on the one or more words (or phrases) and/or the one or more paragraphs in the dialogue text. Specifically, the first processing device 120 may transform the sample speech dialogue data to the dialogue text according to a speech recognition technology (e.g., an automatic speech recognition (ASR)) and input the dialogue text into a text embedding model 31 to obtain the text vector representation sequence.

In some embodiments, the text embedding model 31 may include a word embedding sub-model, a position embedding sub-model, a paragraph embedding sub-model, or the like, or any combination thereof.

The word embedding sub-model may be configured to determine a word vector representation sequence by performing a vectorization on the one or more words (or phrases) in the dialogue text. For example, take a specific word in the dialogue text as an example, a word vector of the specific word may be obtained by performing a vector encoding on the specific word. Accordingly, the word vector representation sequence may be a comprehensive result (e.g., a splicing result) of word vectors corresponding to all words in the dialogue text.

The position embedding sub-model may be configured to determine a position vector representation sequence by performing a vectorization on one or more positions of the one or more words (or phrases) in the dialogue text. For example, take a specific word in the dialogue text as an example, it is assumed that the specific word is in a first position of the dialogue text, a position vector corresponding to the specific word may be a vector representing "first position" and a length of the position vector may be equal to a length of a word vector of the specific word. Accordingly, the position vector representation sequence may be a comprehensive result (e.g., a splicing result) of position vectors corresponding to all words in the dialogue text.

According to some embodiments of the present disclosure, by using the position vector representation sequence, the accuracy of the semantic understanding of the dialogue text by the model (e.g., the text embedding model 31) can be improved. For example, it is assumed that there are two dialogue texts: "he like this movie because it doesn't have an overhead history" and "he doesn't like this movie because it has an overhead history," wherein a main difference between the two dialogue texts is that positions of the words "like" and "doesn't" are different, if only a word vector corresponding to each word in the dialogue text is considered, the semantic difference between the two dialogue texts cannot be accurately determined; whereas if a position vector corresponding to the each word in the dialogue text is considered, the semantic difference between the two dialogue texts may be accurately determined (i.e., the emotional orientations expressed in the two dialogue texts are opposite).

The paragraph embedding sub-model may be configured to determine a paragraph vector representation sequence by performing a vectorization on the one or more paragraphs in the dialogue text. For example, take a specific paragraph in the dialogue text as an example, a paragraph vector of the specific paragraph may be obtained by performing a vector encoding on the specific paragraph. Accordingly, the paragraph vector representation sequence may be a comprehensive result (e.g., a splicing result) of paragraph vectors corresponding to all paragraphs in the dialogue text.

In some embodiments, the word vector representation sequence, the position vector representation sequence, and the paragraph vectors representation sequence may be obtained by performing a vector transformation on the dialogue text via the word embedding sub-model, the position embedding sub-model, and the paragraph embedding sub-model according to a one-hot manner, a word2Vec manner, etc.

In some embodiments, the text vector representation sequence of the sample speech dialogue data may be obtained by merging (e.g., splicing) the word vector representation sequence, the position vector representation sequence, and the paragraph vector representation sequence.

In some embodiments, the word(s) (or the phrase(s)) included in the dialogue text corresponding to the sample speech dialogue data may correspond to phonetic symbol information. Accordingly, the phonetic symbol vector representation sequence may refer to a vector representation sequence determined by performing a vector transformation on the phonetic symbol information of the word(s) (or phrase(s)) in the dialogue text. In some embodiments, the phonetic symbol information may include Chinese Pinyin or phonetic symbols and/or phonograms of other languages, for example, English phonetic symbols, Japanese phonograms, Spanish letters (letters in Spanish correspond to fixed pronunciations, which may be directly used as phonetic symbols), etc.

Specifically, the first processing device 120 may transform the dialogue text to a phonetic text by using a Hidden Markov Model, a conditional random field, a neural network, a transformer, or other models or statistical methods. Further, the first processing device 120 may input the phonetic text into the phonetic symbol embedding model 32 to obtain the phonetic symbol vector representation sequence.

According to some embodiments of the present disclosure, by using the phonetic symbol vector representation sequence, a speech recognition error rate caused by tone or pronunciation may be effectively reduced. For example, there may be polyphonic characters in Chinese language and a same Chinese character may correspond to different pronunciations in different scenes. As another example, Chinese Pinyin may have a level tone (i.e., a first tone), a rising tone (i.e., a second tone), a falling-rising tone (i.e., a third tone), and a falling tone (i.e., a fourth tone). Similar pronunciations (e.g., "ma" and "ma") may correspond to different meanings due to their different tones. As still another example, similar pronunciations may correspond to different English words. Accordingly, the phonetic symbol vector sequence may reflect the tone and the pronunciation of each word in the dialogue text, which may reduce the speech recognition error rate.

In some embodiments, the phonetic symbol embedding model 32 may obtain the phonetic symbol vector representation sequence by performing a vector transformation on the phonetic symbol text according to a one-hot manner, a word2Vec manner, etc.

In some embodiments, the sample speech dialogue data may relate to roles (e.g., a passenger, a driver) who conducted the speech dialogue. Accordingly, the role vector representation sequence may refer to a vector representation sequence determined by performing a vector transformation on role information related to sample speech dialogue data. In some embodiments, the role information related to the sample speed dialogue data may be determined and added into the dialogue text when the sample speech dialogue data is transformed to the dialogue text. Accordingly, the first processing device 120 may input the role information into the role embedding model 33 to obtain the role vector representation sequence. Take a transportation service scenario as an example, it is assumed that a portion of the dialogue text is "hello sir, I want to cancel the order" of which a speaker is a passenger. Accordingly, the role information of the portion of the dialogue text may be determined as "passenger."

According to some embodiments of the present disclosure, by using the role vector representation sequence, the role information of the speaker in the sample speech dialogue data can be considered, which can help to understand the logic of the speech dialogue data. For example, in the above example, the party responsible for canceling the order may be determined as the "passenger" based on the role information.

In some embodiments, the role information may be determined by performing a channel identification operation on the sample speech dialogue data. In some embodiments, one channel may correspond to one role. For example, take a transportation service scenario as an example, "driver," "passenger," and "customer service staff" may correspond to three different channels. In some embodiments, one channel may correspond to a plurality of roles. For example, also take the transportation service scenario as an example, "driver" and "passenger" may correspond to a same channel and "customer service staff" may correspond to another channel.

In some embodiments, the role embedding model 33 may obtain the role vector representation sequence by performing a vector transformation on the role information according to a one-hot manner, etc.

In some embodiments, the text embedding model, the phonetic embedding model, and/or the role embedding model may be an embedding model, a Word2vec model, etc.

In some embodiments, the word(s) (or the phrase(s)) included in the dialogue text corresponding to the sample speech dialogue data may correspond to dialect information. For example, the sample speech dialogue data may be conducted by a speak using a dialect. Accordingly, as shown in operation 308 in FIG. 3B, the first processing device 120

(e.g., the determination module 220) may also obtain a dialect vector representation sequence by performing a vector transformation on the sample speech dialogue data based on a dialect embedding model (e.g., a dialect embedding model 34).

In some embodiments, the dialect information may include a type of the dialect (e.g., Cantonese, Minnan dialect, Henan dialect), a pronunciation of a word or a phrase in the dialect, a meaning of a word or a phrase in the dialect, or the like, or any combination thereof. For example, the pronunciation of a word "上" in a phrase "上车" in Nanjing dialect is in a three tone. As another example, a phrase "冇问题" in Cantonese means "没问题 (i.e., no problem)."

In some embodiments, the dialect information may be determined based on a dialect recognition model. Specifically, the sample speech dialogue data may be inputted into the dialect recognition model and the dialect information may be outputted by the dialect recognition model. In some embodiments, the dialect recognition model may be a neural network model, a logistic regression model, a support vector machine, a random forest, etc. In some embodiments, the dialect recognition model may be trained based on training data with annotations. Specifically, the training data with annotations may be inputted into a preliminary dialect recognition model and one or more parameters of the preliminary dialect recognition model may be updated iteratively until the training process is completed. In some embodiments, the preliminary dialect recognition model may be trained according to one or more model training algorithms (e.g., a gradient descent algorithm). In some embodiments, the training data may be sample speech dialogue data and the annotation may be the dialect information of the sample speech dialogue data. In some embodiments, the annotation of the sample speech dialogue data may be manually added by a user or automatically added by one or more components (e.g., the first processing device 120) of the speech dialogue processing system 100.

In some embodiments, the dialect information may be determined and added in the dialogue text when the sample speech dialogue data is transformed to the dialogue text. The first processing device 120 may input the dialect information into the dialect embedding model 34 to obtain the dialect vector representation sequence.

In some embodiments, the dialect embedding model 34 may obtain the role vector representation sequence by performing a vector transformation on the dialect information according to a one-hot manner, etc.

In some embodiments, the dialect embedding model 34 may be an embedding model, a Word2vec model, etc.

According to some embodiments of the present disclosure, by using the dialect vector representation sequence, the regional language characteristics of the speaker associated with the sample speech dialogue data can be incorporated, which can help understand the logic of the dialogue.

In some embodiments, the sample speech dialogue data may include emotion information of speakers who conducted the speech dialogue. Accordingly, as shown in operation 309 in FIG. 3B, the first processing device 120 (e.g., the determination module 220) may also obtain an emotion vector representation sequence by performing a vector transformation on the sample speech dialogue data based on an emotion embedding model (e.g., an emotion embedding model 35).

In some embodiments, the emotion information may include a positive emotion, a negative emotion, a neutral emotion, etc. For example, take a transportation service scenario as an example, the emotion information of a speech dialogue in which a passenger expresses gratitude to a driver may be determined as the positive emotion; the emotion information of a speech dialogue in which a passenger complain about a driver may be determined as the positive emotion; and the emotion information of a speech dialogue such as "ok" or "I got it" may be determined as the neutral emotion.

In some embodiments, the emotion information may be determined based on an emotion recognition model. Specifically, the sample speech dialogue data may be inputted into the emotion recognition model and the emotion information may be outputted by the emotion recognition model. In some embodiments, the emotion recognition model may be a neural network model, a logistic regression model, a support vector machine, a random forest, etc. In some embodiments, the emotion recognition model may be trained based on training data with annotations. Specifically, the training data with annotations may be inputted into a preliminary emotion recognition model and one or more parameters of the preliminary emotion recognition model may be updated iteratively until the training process is completed. In some embodiments, the preliminary emotion recognition model may be trained according to one or more model training algorithms (e.g., a gradient descent algorithm). In some embodiments, the training data may be sample speech dialogue data and the annotation may be the emotion information of the sample speech dialogue data. In some embodiments, the annotation of the sample speech dialogue data may be manually added by a user or automatically added by one or more components (e.g., the first processing device 120) of the speech dialogue processing system 100.

In some embodiments, the emotion information may be determined and added in the dialogue text when the sample speech dialogue data is transformed to the dialogue text. The first processing device 120 may input the emotion information into the emotion embedding model 35 to obtain the emotion vector representation sequence.

In some embodiments, the emotion embedding model 35 may obtain the emotion vector representation sequence by performing a vector transformation on the emotion information according to a one-hot manner, etc.

In some embodiments, the emotion embedding model 35 may be an embedding model, a Word2vec model, etc.

According to some embodiments of the present disclosure, by using the emotion vector representation sequence, the emotion information of the speakers associated with the sample speech dialogue data can be incorporated, which can help understand the logic of the dialogue. For example, the emotion information may be used to determine an attitude a driver or a passenger, which can help to judge the responsibility of the driver and/or the passenger in a complaint case.

In some embodiments, as shown in operation 310 in FIG. 3B, the first processing device 120 may also obtain a background text of the sample speech dialogue data, which may reflect background information of the sample speech dialogue data. The background information may include a location where the speech dialogue is conducted, a time when the speech dialogue data is conducted, a feature (e.g., a name, the age, the gender, an occupation) of a speaker of the speech dialogue data, or the like, or a combination thereof. Take a transportation service scenario as an example, the background text may include a city where a transportation service corresponding to the sample speed dialogue data is provided, a pick-up time of the transportation service, a pickup location of the transportation service, a destination location of the transportation service, or the like, or a combination thereof.

Further, the first processing device 120 may obtain a background text vector representation sequence by performing a vector transformation on the background text of the sample speech dialogue data based on a background text embedding model (e.g., a background text embedding model 36). For example, the first processing device 120 may input the background text into the background text embedding model 36 to obtain the background text vector representation sequence. In some embodiments, the background text vector representation sequence may include a plurality of background text vectors corresponding to different types of background information. The plurality of background text vectors may be divided by a separator [SEP]. For example, the background text vector representation sequence may be represented as "Beijing [SEP] Haidian District [SEP] 20200721 [SEP] 5 years driving experience."

In some embodiments, the background text embedding model 36 may obtain the background text vector representation sequence by performing a vector transformation on the background text according to a one-hot manner, etc.

In some embodiments, the background text embedding model 36 may be an embedding model, a Word2vec model, etc.

According to some embodiments of the present disclosure, by using the background text vector representation sequence, the background information of the sample speech dialogue data can be incorporated, which can help understand the logic of the dialogue.

In 306, the first processing device 120 (e.g., the training module 230) may obtain a pre-trained speech dialogue coding model by pre-training the speech dialogue coding model in a self-supervised learning manner based on the text vector representation sequence, the phonetic symbol vector representation sequence, and the role vector representation sequence.

In some embodiments, the first processing device 120 may input the text vector representation sequence, the phonetic symbol vector representation sequence, and the role vector representation sequence into a preliminary speech dialogue coding model, and pre-train the preliminary speech dialogue coding model in the self-supervised learning manner. In some embodiments, the first processing device 120 may input the text vector representation sequence, the phonetic symbol vector representation sequence, and the role vector representation sequence into the preliminary speech dialogue coding model, respectively. In some embodiments, the first processing device 120 may merge the text vector representation sequence, the phonetic symbol vector representation sequence, and the role vector representation sequence and input the merged vector representation sequence into the preliminary speech dialogue coding model.

In some embodiments, as shown in operation 312 in FIG. 3B, the first processing device 120 (e.g., the training module 230) may obtain the pre-trained speech dialogue coding model by pre-training the speech dialogue coding model in the self-supervised learning manner based on the text vector representation sequence, the phonetic symbol vector representation sequence, the role vector representation sequence, and at least one of the background text vector representation sequence, the dialect vector representation sequence, or the emotion vector representation sequence. In some embodiments, the first processing device 120 may input the text vector representation sequence, the phonetic symbol vector representation sequence, the role vector representation sequence, and at least one of the background text vector representation sequence, the dialect vector representation sequence, or the emotion vector representation sequence into a preliminary speech dialogue coding model, and pre-train the preliminary speech dialogue coding model in the self-supervised learning manner. In some embodiments, the first processing device 120 may merge the text vector representation sequence, the phonetic symbol vector representation sequence, the role vector representation sequence, and at least one of the background text vector representation sequence, the dialect vector representation sequence, or the emotion vector representation sequence, and input the merged vector representation sequence into the preliminary speech dialogue coding model.

As used herein, "merging" may refer to superposition, concatenation, weighting, transformation, or the like, or a combination thereof. For example, the first processing device 120 may merge the above mentioned vector representation sequences (e.g., the text vector representation sequence, the phonetic symbol vector representation sequence, the role vector representation sequence, the background text vector representation sequence, the dialect vector representation sequence, and/or the emotion vector representation sequence) according to a linear transformation or a neural network transformation, thereby integrating different functions of features embodied in the vector representation sequences. In some embodiments, one or more parameters for merging the above mentioned vector sequences may be default values or determined by one or more components (e.g., the first processing device 120) of the speech dialogue processing system 100 according to different situations. Additionally or alternatively, the one or more parameters for merging the above mentioned vector sequences may be determined by jointly training two or more of the text embedding model 31, the phonetic symbol embedding model 32, the role embedding model 33, the background text embedding model 36, the dialect embedding model 34, and/or the emotion embedding model 35.

According to some embodiments of the present disclosure, by merging a plurality of vector representation sequences, the speech dialogue coding model can learn the dialogue text information, the phonetic symbol information, the role information, the background information, the dialect information, and/or the emotion information from the merged vector representation sequence simultaneously. The meaning of the word(s) in the speech dialogue data can be determined accurately based on the dialogue text information, the phonetic symbol information, the dialect information, and the emotion information of the speech dialogue data. In addition, the role information and the background information may help determine the logic of the speech dialogue, thereby making the understanding of the speech dialogue accurate.

In some embodiments, the speech dialogue coding model may be a transformer model. The transformer model may encode contextual information of an inputted vector representation sequence and generate a contextual representation sequence. As used herein, the contextual representation sequence may refer to a vector sequence that combines the contextual information of the inputted vector representation sequence. For example, if there is a sentence "I have a dog, it is cute," it may be determined that "it" refers to "dog" by learning the contextual information for the word "it."

In some embodiments, the transformer model may include an encoder and a decoder. The encoder may be an encoding component including a plurality of encoders and the decoder may be a decoding component including a plurality of decoders. Each of the plurality of encoders may include a self-attention layer and a feedforward neural network layer. Each of the plurality of decoders may include a self-attention layer, an encoding-decoding attention layer, and a feedforward neural network layer. The transformer model may process all elements in an inputted vector representation sequence in parallel, and merge the contextual information with one or more distant elements by using the attention layer structure. As an example, the transformer model may include 12-layer encoder and decoder, with 768 hidden size, and 12 attention heads, which contains about 110 M parameters.

In some embodiments, the speech dialogue coding model may be a bidirectional encoder representations from transformers (BERT) model, an XLNet model, a generative pretrained transformer 2 (GPT-2), a text-to-text transfer transformer (T5) constructed based on a transformer technology, a neural network model, or the like, or a combination thereof.

In some embodiments, at least one or at least part of the text embedding model 31, the phonetic symbol embedding model 32, the role embedding model 33, the background text embedding model 36, the dialect embedding model 34, and/or the emotion embedding model 35 may be jointly pre-trained with the speech dialogue coding model. For example, the paragraph embedding sub-model of the text embedding model 31 may not involve in the jointly pre-training process, and the word embedding sub-model and the position embedding sub-model may involve in the jointly pre-training process.

In some embodiments, after the pre-training of the speech dialogue coding model is completed, the speech dialogue coding model may be adjusted based on a downstream task model (e.g., a classification model, a summary extraction model, a translation model) and sample data with annotations (which correspond to a corresponding downstream task, for example, "category," "summary," "translation"), which may improve the processing effect of a downstream task.

Figure 4:
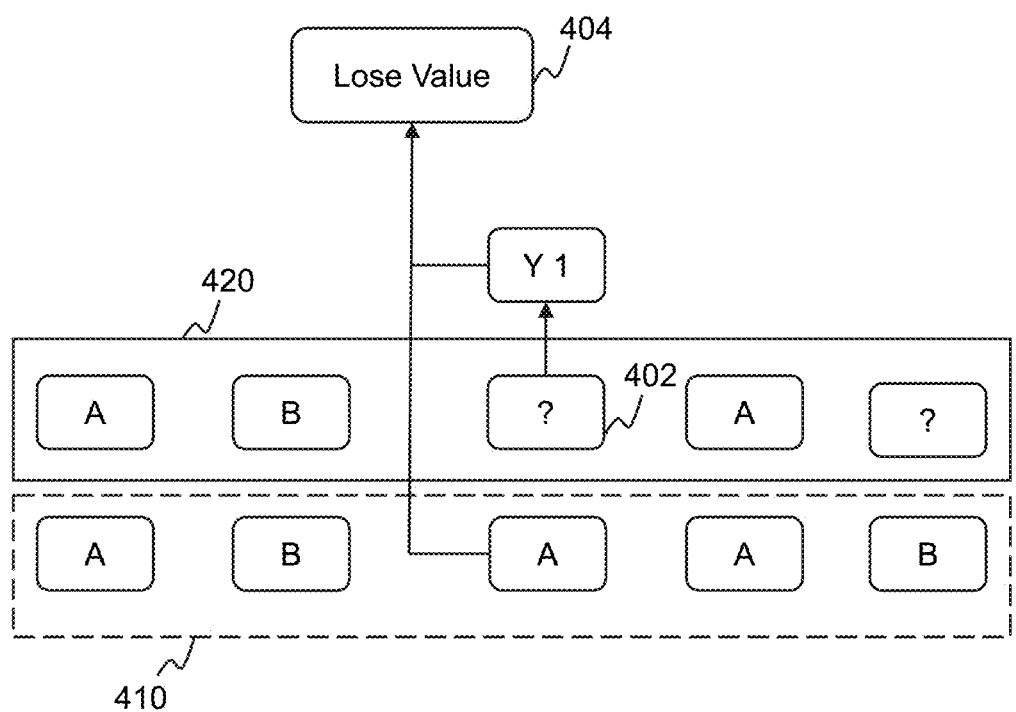
FIG. 4 is a schematic diagram illustrating an exemplary process for training a speech dialogue coding model in a self-supervised learning manner according to some embodiments of the present disclosure.

More descriptions regarding the self-supervised learning manner may be found elsewhere in the present disclosure (e.g., FIG. 4 and descriptions thereof).

In some scenarios, the dialogue text obtained by performing an automatic speech recognition on speech dialogue data may be not smooth and may correspond to a noisy spoken language and/or a complex dialogue logic, which may cause a serious interference to a subsequent speech dialogue processing (e.g., classification result determination, summary extraction, machine translation). According to some embodiments of the present disclosure, a vectorization may be performed the sample speech dialogue data using a plurality of embedding models (e.g., the phonetic symbol embedding model, the role embedding model, the text embedding model, the background text embedding model, the dialect embedding model, and the emotion embedding model). Accordingly, the role information, the phonetic symbol information, the background information, the dialect information, and/or the emotion information can be considered during the training process of the speech dialogue coding model, which may reduce errors caused by the automatic speech recognition and help understand the logic of complex dialogues. Accordingly, the performance of the trained speech dialogue coding model may be improved.

For example, take a transportation service scenario as an example, if there is a service disagreement (e.g., a responsibility for canceling an order) between a driver and a passenger, a responsibility judgment may be determined based on speech dialogue data between the driver, the passenger, and a customer service staff. The speech dialogue data may be associated with a plurality of roles (e.g., the driver, the passenger, the customer service staff), which may complicate the responsibility judgment. For example, the speech dialogue data may be "the driver said: he asked me to make the cancellation; the passenger said: I did not ask him to cancel the order; the customer service said: who made the cancellation?" The pronoun appears many times in the speech dialogue data, which may be difficult for a model to understand the dialogue logic. By considering the role information of the speech dialogue data, the logic of the speech dialogue data may be determined clearly. For example, "he" mentioned by the driver may refer to the passenger, "he" mentioned by the passenger may refer to the driver, and "who" mentioned by the customer service staff may refer to the driver or the passenger.

In addition, the speech dialogue data may be related to tone and pronunciation. By considering the phonetic symbol information and/or the dialect information of the speech dialogue data, the semantics of the speech dialogue data may be determined accurately. For example, "取消" and "取笑" have similar pronunciations but different tones, "消" has a first tone, and "笑" has a fourth tone. By inputting the phonetic symbol information of the speech dialogue data into the model (e.g., a speech dialogue coding model), the model can determine that the semantic of the speech dialogue data is "cancel an order" instead of "make fun of someone." As another example, "时间" in Nanjing dialect have a similar pronunciation with "实践" in Mandarin. By inputting the dialect information of the speech dialogue data into the model (e.g., a speech dialogue coding model), the model can determine that the semantic of the speech dialogue data is "time" instead of "practice."

In order to evaluate the performance of the speech dialogue coding model described in the present disclosure, an express dataset and a premier dataset were used to compare the processing effect of a CNN, a HAN, a BERT, and the speech dialogue coding model in a downstream task (e.g., classification). The experimental results are illustrated in Table 1 below. As used in Table 1, "random" refers to word embedding randomly initialized, "W2v" refers to word embedding initialized by word2vec, and "Elmo" refers to word embedding initialized by Elmo.

TABLE 1

The experimental results of Express and Premier datasets using different models

| Model | Expression dataset (Accuracy/%) | Premier dataset (Accuracy/%) |
|---|---|---|
| CNN-random | 78.8 | 79.2 |
| CNN-W2v | 80.1 | 80.3 |
| CNN-Elmo | 82.6 | 82.8 |
| HAN-rand | 80.1 | 80.2 |
| HAN- W2v | 81.3 | 81.5 |
| HAN- rand | 83.9 | 84.2 |
| BERT-base | 81.6 | 81.8 |
| speech dialogue coding model in the present disclosure | 86.5 | 86.5 |

As shown in Table 1, it can be seen that the performance of the speech dialogue coding model is better than other models in downstream tasks.

Furthermore, to further validate the effectiveness of the phonetic symbol information and the role information, a plurality of ablation experiments were conducted on the two datasets. The experimental results are illustrated in Table 2: As used in Table 2, "-phonetic" refers to that a phonetic symbol embedding model is removed, that is, phonetic symbol information is not considered in the speech dialogue coding model; "-role" refers to that a role embedding model is also removed with the phonetic symbol embedding model, that is, both the role information and the phonetic symbol information are not considered in the speech dialogue coding model.

TABLE 2

The effectiveness of phonetic symbol information and role information

|  | Expression dataset (accuracy/%) | Premier data set (accuracy/%) |
|---|---|---|
| speech dialogue coding model | 86.3 | 86.5 |
| -phonetic | 85.2 | 85.4 |
| -role | 83.6 | 83.9 |

As shown in Table 2, it can be seen that the performance of the speech dialogue coding model in downstream tasks can be improved evidently with the role information and the phonetic symbol information taken into consideration.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. In some embodiments, one or more other optional operations (e.g., a storage operation, a preprocessing operation) may be added in the process 300A and/or the process 300B. For example, before operation 304, the first processing device 120 may determine the dialogue text and the phonetic text of the sample speech dialogue data by preprocessing the sample speech dialogue data and then determine the text vector representation sequence and the phonetic symbol vector representation sequence based on the dialogue text and the phonetic text, respectively.

FIG. 4 is a schematic diagram illustrating an exemplary process for training a speech dialogue coding model in a self-supervised learning manner according to some embodiments of the present disclosure. In some embodiments, the process 400 may be executed by the speech dialogue processing system 100. For example, the process 400 may be stored in a storage device (e.g., a ROM 730, a RAM 740, a storage 890) as a form of instructions, and invoked and/or executed by a processing device (e.g., the first processing device 120, a processor 720 of a computing device 700 illustrated in FIG. 7, a CPU 840 of a mobile device 800 illustrated in FIG. 8, one or more modules shown in FIG. 2). The operations of the illustrated process presented below are intended to be illustrative.

As used herein, a self-supervised learning may refer to that a model (e.g., a speech dialogue coding model) is trained based on training data without predetermined annotations. For example, an order of sentences in sample data without annotations may be randomly disrupted, and disrupted sentences may be used as an input of the model. Then the model may learn the order of the sentences in the self-supervising learning manner. In this case, the correct order of the sentences may be determined as an "annotation." According to the self-supervised learning manner, the dependence on training data with annotations can be effectively reduced during model training.

In some embodiments, during the pre-training of the speech dialogue coding model in the self-supervised learning manner, at least portion of at least one of the text vector representation sequence, the phonetic symbol vector representation sequence, the role vector representation sequence, the background text vector representation sequence, the dialect vector representation sequence, or the emotion vector representation sequence may be designated as an annotation.

In some embodiments, the annotation may include at least a portion of elements in the role vector representation sequence. For example, as shown in FIG. 4, 410 represents a portion of the vector representation sequence (e.g., a role vector representation sequence) inputted into the speech dialogue coding model, A represents a vector representation of a role a, and B represents a vector representation of a role b. Then a portion (i.e., 420) of the vector representation sequence 410 may be randomly selected, a portion of elements (e.g., 402) thereof may be masked, and value(s) of the masked element(s) (e.g., 402) may be designated as annotation(s) for training. Merely by way of example, it is assumed that a predicted value of 402 is "Y1," the annotation of 402 is "A," and a loss value 404 may be determined based on the predicted value and the annotation. Then one or more parameters of the model may be adjusted based on the loss value 404. For example, the one or more parameters may be adjusted based on the loss value 404 according to a gradient descent algorithm.

In some embodiments, the annotation may also include one or more keywords in a text vector representation sequence. The keyword(s) may be pre-set word(s) or a randomly set word(s). Accordingly, a training task can be considered as a "keyword prediction task." Specifically, a portion of elements in the text vector representation sequence may be masked according to a preset keyword list and value(s) of the masked element(s) may be designated as annotation(s) for training. Further, a loss value may be determined based on predicted values and annotations. Then one or more parameters of the model may be adjusted based on the loss value. By masking the keyword(s), contextual information and/or phrase expressions can be learnt more effectively by the speech dialogue coding model.

In some embodiments, the annotation may further include an order of sentences embodied in the text vector representation sequence. Accordingly, the training task can be considered as a "sentence order prediction task." For example, it is assumed that the dialogue text includes three sentences A, B, and C and the order of the sentences is "sentence A is before sentence B and sentence B is after sentence A and before sentence C." Compared with a task for only predicting a sentence next to a specific sentence, the sentence order prediction task can focus on the coherence of the sentences and improve the performance of the model.

Figure 5:
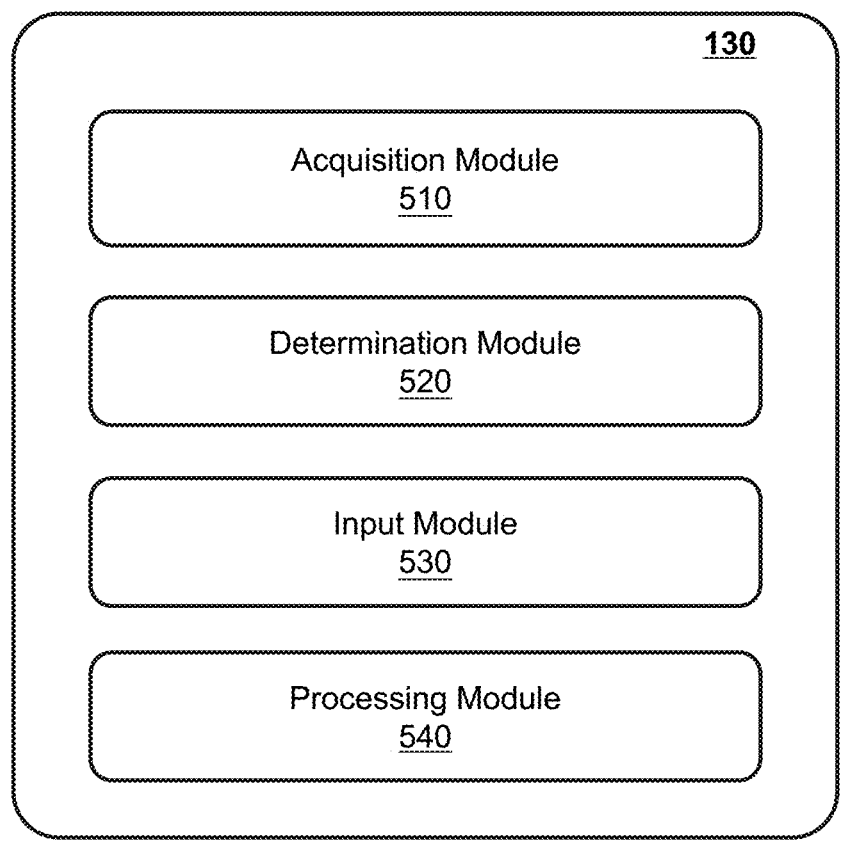
FIG. 5 is a block diagram illustrating an exemplary second processing device according to some embodiments of the present disclosure.

FIG. 5 is a block diagram illustrating an exemplary second processing device according to some embodiments of the present disclosure. As shown in FIG. 5, the second processing device 130 may include an acquisition module 510, a determination module 520, an input module 530, and a processing module 540.

The acquisition module 510 may obtain target speech dialogue data. In some embodiments, the acquisition module 510 may obtain target speech dialogue data from one or more components (e.g., the user terminal 110) of the speech dialogue processing system 100 or an external storage device. More descriptions for obtaining the target speech dialogue data may be found elsewhere in the present disclosure (e.g., FIGS. 6A, 6B, and descriptions thereof).

The determination module 520 may obtain a text vector representation sequence, a phonetic symbol vector representation sequence, and a role vector representation sequence by performing a vector transformation on target speech dialogue data based on a text embedding model, a phonetic symbol embedding model, and a role embedding model, respectively. The determination module 520 may obtain at least one of a dialect vector representation sequence, an emotion vector representation sequence, or a background text vector representation sequence corresponding to the target speech dialogue data. The dialect vector representation sequence may be determined by performing a vector transformation on the target speech dialogue data based on a dialect embedding model. The emotion vector representation sequence may be determined by performing a vector transformation on the target speech dialogue data based on an emotion embedding model. The background text vector representation sequence may be determined by performing a vector transformation on a background text of the target speech dialogue data based on a background text embedding model. More descriptions for obtaining the text vector representation sequence, the phonetic symbol vector representation sequence, the role vector representation sequence, the dialect vector representation sequence, the emotion vector representation sequence, the background text vector representation sequence may be found elsewhere in the present disclosure (e.g., FIGS. 6A, 6B, and descriptions thereof).

The input module 530 may determine a representation vector corresponding to target speech dialogue data by inputting a text vector representation sequence, a phonetic symbol vector representation sequence, and a role vector representation sequence into a trained speech dialogue coding model. For example, the input module 530 may determine a representation vector corresponding to target speech dialogue data by inputting a text vector representation sequence, a phonetic symbol vector representation sequence, a role vector representation sequence, and at least one of a dialect vector representation sequence, a emotion vector representation sequence, and a background text vector representation sequence into a trained speech dialogue coding model. More descriptions for determining the representation vector corresponding to the target speech dialogue data may be found elsewhere in the present disclosure (e.g., FIGS. 6A, 6B, and descriptions thereof).

The processing module 540 may determine a summary of target speech dialogue data by inputting a representation vector into a classification model. More descriptions for determining the summary of the target speech dialogue data may be found elsewhere in the present disclosure (e.g., FIGS. 6A, 6B, and descriptions thereof).

It should be noted that the second processing device 130 may be implemented in various ways, for example, implemented by hardware, software, or a combination of the software and the hardware. The hardware may be implemented by using dedicated logic. The software may be stored in a memory, and implemented by a microprocessor or dedicated design hardware. For persons having ordinary skills in the art, it should be understood that the second processing device 130 and the modules may be implemented by using a computer-executable instruction and/or a control code included in a processor. For example, a code may be provided on a carrier medium such as a disk, a CD or a DVD-ROM, a programmable memory such as a read-only memory (e.g., a firmware), or a data carrier such as an optical or electronic signal carrier. The second processing device 130 and the modules may not only be implemented by a hardware circuit, such as a super-large-scale integration, a gate array, a semiconductor such as a logic chip and a transistor, or a programmable hardware device such as a field-programmable gate array and a programmable logic device, etc., it may also be implemented by software executed by various types of processors, or a combination of the hardware circuit and the software (e.g., a firmware).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the acquisition module 510 and the determination module 520 may be integrated into a single module. As another example, each module of the second processing device 130 may share a single storage module, or each module of the second processing device 130 may have a corresponding storage module.

Figure 6A:
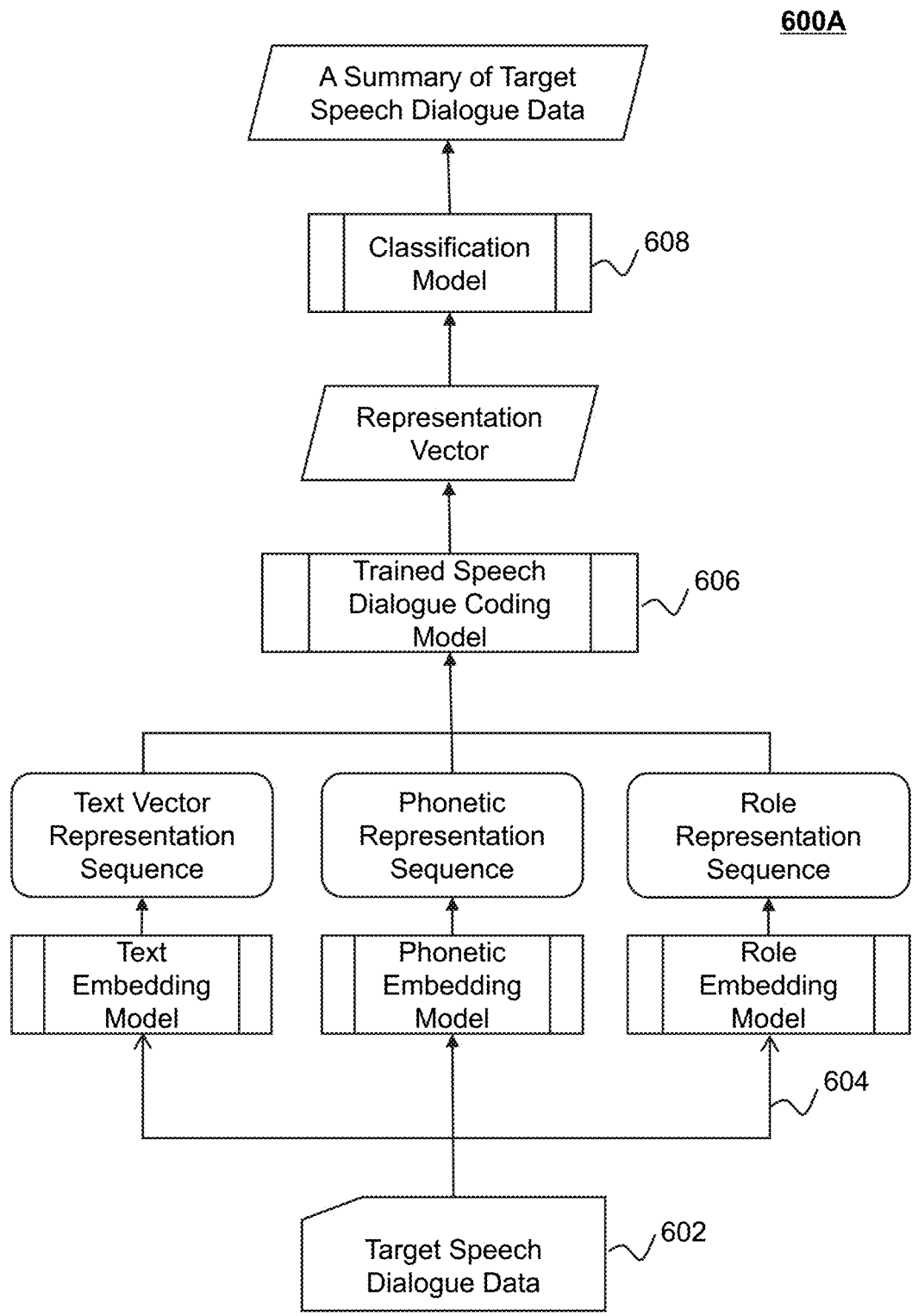
FIG. 6A is a schematic diagram illustrating an exemplary process for extracting a summary of target speech dialogue data according to some embodiments of the present disclosure.
Figure 6B:
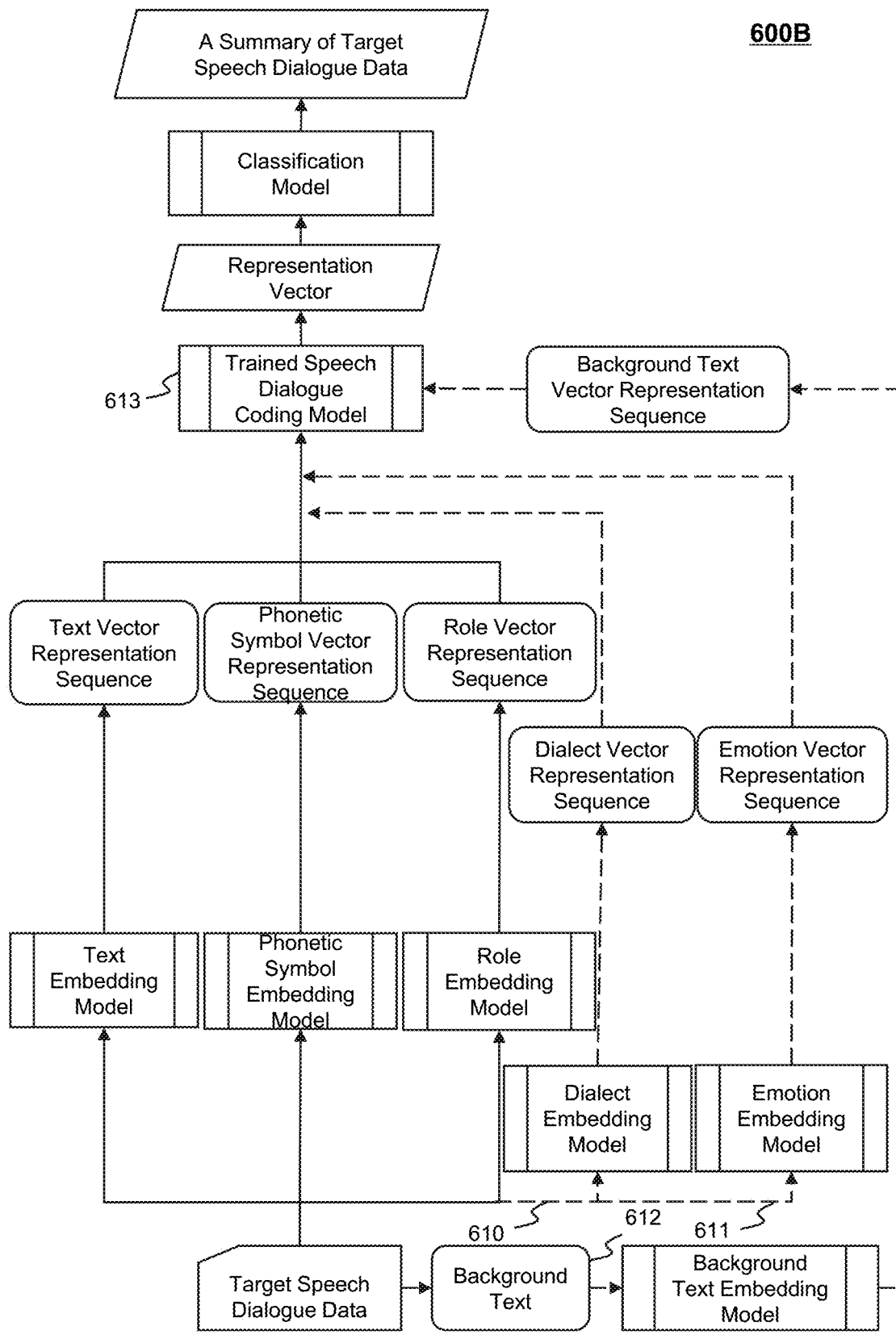
FIG. 6B is a schematic diagram illustrating an exemplary process for extracting a summary of target speech dialogue data according to some embodiments of the present disclosure.

FIG. 6A is a schematic diagram illustrating an exemplary process for extracting a summary of target speech dialogue data according to some embodiments of the present disclosure. FIG. 6B is a schematic diagram illustrating an exemplary process for extracting a summary of target speech dialogue data according to some embodiments of the present disclosure. The process 600A and/or the process 600B may be executed by the speech dialogue processing system 100. For example, the process 600A and/or the process 600B may be stored in a storage device (e.g., a ROM 730, a RAM 740, a storage 890) as a form of instructions, and invoked and/or executed by a processing device (e.g., the second processing device 130, a processor 720 of a computing device 700 illustrated in FIG. 7, a CPU 840 of a mobile device 800 illustrated in FIG. 8, one or more modules shown in FIG. 2). The operations of the illustrated process presented below are intended to be illustrative. In some embodiments, the process 600A and/or the process 600B may be accomplished with one or more additional operations not described and/or without one or more of the operations discussed. Additionally, the order in which the operations of the process 600A as illustrated in FIG. 6A and/or the process 600B as illustrated in FIG. 6B and described below is not intended to be limiting.

In 602, the second processing device 130 (e.g., the acquisition module 510) may obtain target speech dialogue data. Take a transportation service scenario as an example, the target speech dialogue data may include speech dialogue data between a driver and a passenger, speech dialogue data between a driver (or a passenger) and a customer service staff, speech dialogue data between the driver, the passenger, and the customer service staff, etc.

In some embodiments, similar to the sample speed dialogue data, the target speech dialogue data may be in any form (e.g., a voice form, a video form, a picture form, a text form).

As described in connection with operation 302, the second processing device 130 may obtain the target speech dialogue data from one or more components (e.g., the user terminal 110, a storage device) of the speech dialogue processing system 100 or an external storage device. For example, in a transportation service scenario, the user terminal 110 may record speech dialogue data between a passenger and a driver in real-time and store the speech dialogue data in a storage device of the speech dialogue processing system 100 or an external storage device. Accordingly, the second processing device 130 may obtain the speech dialogue data (i.e., the target speech dialogue data) from the storage device, the user terminal 110, or the external storage device.

In 604, the second processing device 130 (e.g., the determination module 520) may obtain a text vector representation sequence, a phonetic symbol vector representation sequence, and a role vector representation sequence by performing a vector transformation on the target speech dialogue data based on a text embedding model, a phonetic symbol embedding model, and a role embedding model, respectively.

In some embodiments, as shown in operation 610 in FIG. 6B, the second processing device 130 (e.g., the determination module 520) may also obtain a dialect vector representation sequence by performing a vector transformation on the target sample speech dialogue data based on a dialect embedding model.

In some embodiments, as shown in operation 611 in FIG. 6B, the second processing device 130 (e.g., the determination module 520) may also obtain an emotion vector representation sequence by performing a vector transformation on the target sample speech dialogue data based on an emotion embedding model.

In some embodiments, as shown in operation 612 in FIG. 6B, the second processing device 130 (e.g., the determination module 520) may also obtain a background text of the target speech dialogue data and obtain a background text vector representation sequence by performing a vector transformation on the background text of the target speech dialogue data based on a background text embedding model.

More descriptions regarding obtaining the text vector representation sequence, the phonetic symbol vector representation sequence, the role vector representation sequence, the dialect vector representation sequence, the emotion vector representation sequence, and/or the background text vector representation sequence may be found elsewhere in the present disclosure (e.g., FIG. 3A, FIG. 3B, and descriptions thereof).

In 606, the second processing device 130 (e.g., the input module 530) may determine a representation vector corresponding to the target speech dialogue data by inputting the text vector representation sequence, the phonetic symbol vector representation sequence, and the role vector representation sequence into a trained speech dialogue coding model.

In some embodiments, as shown in operation 613 in FIG. 6B, the second processing device 130 (e.g., the input module 530) may determine the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model.

In some embodiments, the second processing device 130 may merge the text vector representation sequence, the phonetic symbol vector representation sequence, and the role vector representation sequence and input the merged vector representation sequence into the trained speech dialogue coding model. In some embodiments, the second processing device 130 may merge the text vector representation sequence, the phonetic symbol vector representation sequence, the role vector representation sequence, and at least one of the dialect vector representation sequence, the emotion vector representation sequence, or the background text vector representation sequence and input the merged vector representation sequence into the trained speech dialogue coding model. More descriptions regarding merging the vector representation sequences may be found elsewhere in the present disclosure (e.g., FIG. 3A, FIG. 3B, and descriptions thereof).

As described elsewhere in the present disclosure, according to the trained speech dialogue coding model, text information, phonetic symbol information, role information, and at least one of the dialect information, the emotion information, or the background text information of the target speech dialogue data can be comprehensively considered, accordingly semantic information thereof can be accurately understood, and a corresponding representation vector can be outputted. In some embodiments, the representation vector may be a plurality of vector sequences including a symbol [CLS] and a separator [SEP].

In 608, the second processing device 130 (e.g., the processing module 540) may determine a summary of the target speech dialogue data by inputting the representation vector into a classification model. As used herein, a summary of speech dialogue data may refer to content (e.g., a keyword, a key sentence, a key paragraph) reflecting key semantic information of the speech dialogue data.

In some embodiments, the representation vector may include separators used to distinguish different sentences, accordingly, the representation vector may include a plurality of sub-vectors corresponding different sentences. For each of the plurality of sub-vectors, the second processing device 130 may classify the sub-vector based on the classification model to determine whether a sentence corresponding to the sub-vector is the summary of the target speech dialogue data. In response to determining that the sentence corresponding to the sub-vector is the summary, the second processing device 130 may output "1," that is, the second processing device 130 may designate the sentence as the summary of the target speech dialogue data. In response to determining that the sentence corresponding to the sub-vector is not the summary, the second processing device 130 may output "0," that is, the second processing device 130 does not designate the sentence as the summary of target speech dialogue data.

In some embodiments, the second processing device 130 may input the representation vector into the classification model and generate the summary of the target speech dialogue data. In this situation, the summary of the target speech dialogue data may be a content not the same as the original contents (e.g., sentences) of the target speech dialogue data. For example, it is assumed that the representation vector of the target speech dialogue data is "[CLS] driver[SEP]hello sir[SEP] may I ask when to leave" and the summary of the may be target speech dialogue data "departure time," "start time," etc.

In some embodiments, the classification model may be a neural network model, a logistic regression model, a support vector machine, a random forest, etc. In some embodiments, the classification model may be trained based on training data with annotations. In some embodiments, the training data may be sample speech dialogue data and the annotation may be a summary of the sample speech dialogue data. In some embodiments, the annotation of the sample speech dialogue data may be manually added by a user or automatically added by one or more components (e.g., the first processing device 120) of the speech dialogue processing system 100.

Specifically, the training data with annotations may be inputted into a preliminary classification model and one or more parameters of the preliminary classification model may be updated iteratively until the training process is completed. In some embodiments, the preliminary classification model may be trained according to one or more model algorithms (e.g., a gradient descent algorithm).

In some embodiments, the classification model may be jointly trained with a pre-trained speech dialogue coding model (e.g., the pre-trained speech dialogue coding model described in FIG. 3A and FIG. 3A). In the jointly training process, the pre-trained speech dialogue coding model may be further adjusted and/or updated (e.g., fine-tuned). For example, training data with annotations may be inputted into the pre-trained speech dialogue coding model, a representation vector outputted from the pre-trained speech dialogue coding model may be inputted into the classification model, and the classification model may output a classification result. Further, both the parameters of the pre-trained speech dialogue coding model and the parameters of the classification model may be updated based on the classification result until the jointly training process is completed.

In some embodiments, the second processing device 130 may obtain a sentence text of the summary and perform a grammatical correction operation on the sentence text. As used herein, the grammatical correction operation may refer to correcting spelling errors and/or grammatical errors (e.g., lack of a subject, a mismatch between a predicate and a subject) in the sentence text of the summary. For example, "取笑订单" in the summary sentence may be corrected to "取笑订单" As another example, in a transportation service scenario, it is assumed that a speech dialogue between a driver and a passenger is that: the passenger said: "sir, when will you arrive?" the driver said: "right now," and the summary of the speech dialogue may be determined as "right now." In this case, the second processing device 130 may correct the summary as "I will pick you up right now."

In some embodiments, the second processing device 130 may perform the grammatical correction operation based on a grammar correction model. In some embodiments, the grammar correction model may include a neural network model, an N-gram model, or the like, or a combination thereof.

In some embodiments, the present disclosure may also provide a method for classifying a speech dialogue.

Specifically, the second processing device 130 (e.g., the acquisition module 510) may obtain target speech dialogue data. More descriptions regarding obtaining the target speech dialogue data may be found elsewhere in the present disclosure (e.g., operation 602 and the description thereof).

The second processing device 130 (e.g., the determination module 520) may obtain a text vector representation sequence, a phonetic symbol vector representation sequence, and a role vector representation sequence by performing a vector transformation on the target speech dialogue data based on the text embedding model, the phonetic symbol embedding model, and the role embedding model, respectively. The second processing device 130 (e.g., the determination module 520) may also obtain at least one of a dialect vector representation sequence, an emotion vector representation sequence, or a background text vector representation sequence corresponding to the target speech dialogue data. More descriptions regarding determining the vector representation sequences may be found elsewhere in the present disclosure (e.g., operations 604, 610, 611, and 612 and the descriptions thereof).

The second processing device 130 (e.g., the input module 530) may determine a representation vector corresponding to the target speech dialogue data by inputting the text vector representation sequence, the phonetic symbol vector representation sequence, and the role vector representation sequence into a trained speech dialogue coding model. In some embodiments, the second processing device 130 (e.g., the input module 530) may determine the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model. More descriptions regarding determining the representation vector corresponding to the target speech dialogue data may be found elsewhere in the present disclosure (e.g., operations 606 and 613 and the descriptions thereof).

Further, the second processing device 130 (e.g., the processing module 540) may determine an intention classification result of the target speech dialogue data by inputting the representation vector into a classification model (e.g., an intention classification model). As used herein, an intention classification result of a speech dialogue data may refer to a classification of thoughts and/or semantics of users (e.g., a passenger, a driver) associated with the speech dialogue data. For example, take a transportation service scenario as an example, if there is a service disagreement between a driver and a passenger, a responsibility judgment may be made based on the target speech dialogue data. In this case, the intention classification result may be "driver responsibility," "passenger responsibility," "both the driver and the passenger has no responsibility," "responsibility cannot be judged," etc.

In some embodiments, the intention classification model may be a neural network model, a logistic regression model, a support vector machine, a random forest, or the like, or a combination thereof. In some embodiments, the intention classification model may be trained based on training data with annotations. In some embodiments, the training data may be sample speech dialogue data and the annotation may be an intention classification result of the sample speech dialogue data. In some embodiments, the annotation of the training data may be manually added by a user or automatically added by one or more components (e.g., the first processing device 120) of the speech dialogue processing system 100. In some embodiments, the training process of the intention classification model may be similar to the training process of the classification model and details are not repeated here.

In some embodiments, the present disclosure may also provide a method for determining an answer (e.g., an answer to a question) in a speech dialogue.

Specifically, the second processing device 130 (e.g., the acquisition module 510) may obtain target speech dialogue data (e.g., a question). More descriptions regarding obtaining the target speech dialogue data may be found elsewhere in the present disclosure (e.g., operation 602 and the description thereof).

The second processing device 130 (e.g., the determination module 520) may obtain a text vector representation sequence, a phonetic symbol vector representation sequence, and a role vector representation sequence by performing a vector transformation on the target speech dialogue data based on a text embedding model, a phonetic symbol embedding model, and a role embedding model, respectively. The second processing device 130 (e.g., the determination module 520) may also obtain at least one of a dialect vector representation sequence, an emotion vector representation sequence, or a background text vector representation sequence corresponding to the target speech dialogue data. More descriptions regarding determining the vector representation sequences may be found elsewhere in the present disclosure (e.g., operations 604, 610, 611, and 612 and the descriptions thereof).

The second processing device 130 (e.g., the input module 530) may determine a representation vector corresponding to the target speech dialogue data by inputting the text vector representation sequence, the phonetic symbol vector representation sequence, and the role vector representation sequence into a trained speech dialogue coding model. In some embodiments, the second processing device 130 (e.g., the input module 530) may determine the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model. More descriptions regarding determining the representation vector corresponding to the target speech dialogue data may be found elsewhere in the present disclosure (e.g., operations 606 and 613 and the descriptions thereof).

Further, the second processing device 130 (e.g., the processing module 540) may determine an answer for the target speech dialogue data (e.g., a question in the target speech dialogue data) by inputting the representation vector into a question-answer (QA) model. In some embodiments, the QA model may include a retrieval sub-model (e.g., a BM25 model) and an answer determination sub-model. Specifically, the second processing device 130 may determine a plurality of candidate answers for the target speech dialogue data based on the retrieval sub-model and identify a target answer from the plurality of candidate answers based on the answer determination sub-model.

According to some embodiments of the present disclosure, various information (e.g., the dialogue text information, the phonetic symbol information, the role information, the background information, the dialect information, and/or the emotion information) is taken into consideration, accordingly, the QA model can provide answers in various expressions in response to different speech dialogue data. For example, if a user asks a question in Cantonese dialect, the QA model may output an answer in Cantonese dialect. As another example, if the emotion of a user that asks the question is relatively down, the QA model may output the answer using a comforting language.

In some embodiments, the QA model may be a text matching model. For example, the QA model may be a BERT model. In some embodiments, the QA model may be trained based on training data with annotations. In some embodiments, the training data may be sample speech dialogue data (e.g., a sample question) and the annotation may be a sample answer for the sample speech dialogue data. In some embodiments, the annotation of the training data may be manually added by a user or automatically added by one or more components (e.g., the first processing device 120) of the speech dialogue processing system 100. In some embodiments, the training process of the QA model may be similar to the training process of the classification model and details are not repeated here.

In some embodiments, the present disclosure may also provide a method for translating a speech dialogue.

Specifically, the second processing device 130 (e.g., the acquisition module 510) may obtain target speech dialogue data. More descriptions regarding obtaining the target speech dialogue data may be found elsewhere in the present disclosure (e.g., operation 602 and the description thereof).

The second processing device 130 (e.g., the determination module 520) may obtain a text vector representation sequence, a phonetic symbol vector representation sequence, and a role vector representation sequence by performing a vector transformation on the target speech dialogue data based on a text embedding model, a phonetic symbol embedding model, and a role embedding model, respectively. The second processing device 130 (e.g., the determination module 520) may also obtain at least one of a dialect vector representation sequence, an emotion vector representation sequence, or a background text vector representation sequence corresponding to the target speech dialogue data. More descriptions regarding determining the vector representation sequences may be found elsewhere in the present disclosure (e.g., operations 604, 610, 611, and 612 and the descriptions thereof).

The second processing device 130 (e.g., the input module 530) may determine a representation vector corresponding to the target speech dialogue data by inputting the text vector representation sequence, the phonetic symbol vector representation sequence, and the role vector representation sequence into a trained speech dialogue coding model. In some embodiments, the second processing device 130 (e.g., the input module 530) may determine the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model. More descriptions regarding determining the representation vector corresponding to the target speech dialogue data may be found elsewhere in the present disclosure (e.g., operations 606 and 613 and the descriptions thereof).

Further, the second processing device 130 (e.g., the processing module 540) may determine a translation result of the target speech dialogue data by inputting the representation vector into a translation model. For example, if the target speech dialogue data is in Chinese, the translation model may output a translation result of the target speech dialogue data in English.

According to some embodiments of the present disclosure, various information (e.g., the dialogue text information, the phonetic symbol information, the role information, the background information, the dialect information, and/or the emotion information) is taken into consideration, accordingly, the logic of the target speech dialogue data can be understood accurately and the accuracy of the translation result can be improved.

In some embodiments, the translation model may be a transform model, a long short-term memory (LSTM) model, etc. In some embodiments, the translation model may be trained based on training data with annotations. In some embodiments, the training data may be sample speech dialogue data and the annotation may be a sample translation result of the sample speech dialogue data. In some embodiments, the annotation of the training data may be manually added by a user or automatically added by one or more components (e.g., the first processing device 120) of the speech dialogue processing system 100. In some embodiments, the training process of the translation model may be similar to the training process of the classification model and details are not repeated here.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted.

Figure 7:
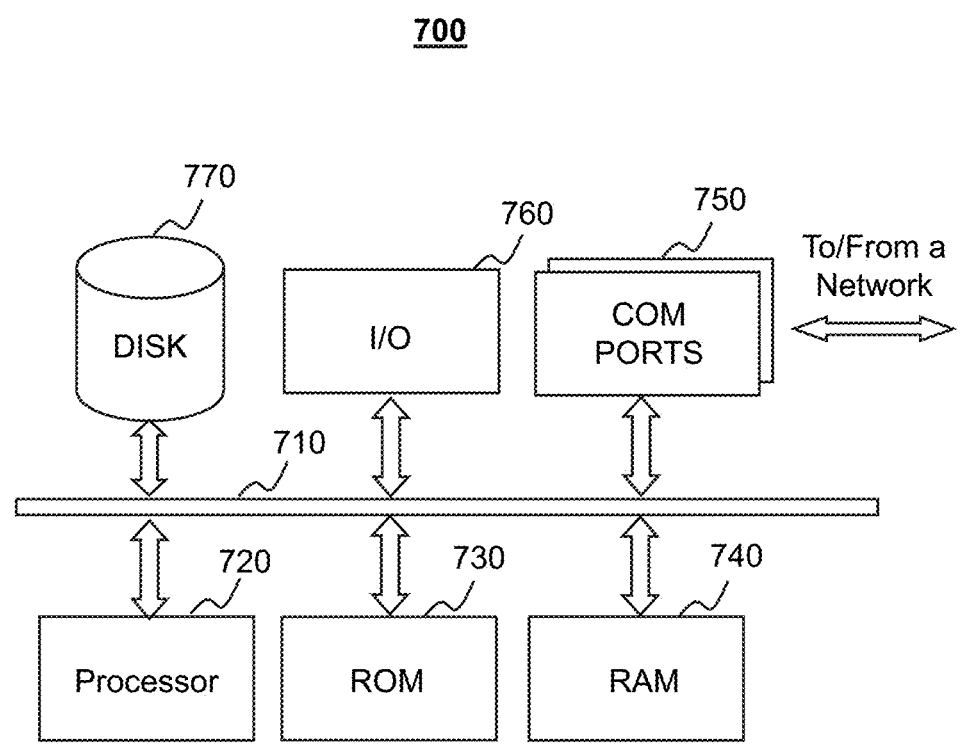
FIG. 7 is a schematic diagram illustrating exemplary hardware and/or software components of an exemplary computing device according to some embodiments of the present disclosure.

FIG. 7 is a schematic diagram illustrating exemplary hardware and/or software components of an exemplary computing device according to some embodiments of the present disclosure. In some embodiments, the first processing device 120, the second processing device 130, and/or the user terminal 110 may be implemented on the computing device 700. For example, the second processing device 130 may be implemented on the computing device 700 and configured to perform functions of the second processing device 130 disclosed in this disclosure.

The computing device 700 may be used to implement any component of the speech dialogue processing system 100 as described herein. For example, the second processing device 130 may be implemented on the computing device 700, via its hardware, software program, firmware, or a combination thereof. Although only one such computer is shown, for convenience, the computer functions relating to the online service as described herein may be implemented in a distributed fashion on a number of similar platforms to distribute the processing load.

The computing device 700 may include COM ports 750 connected to and from a network connected thereto to facilitate data communications. The computing device 700 may also include a processor 720, in the form of one or more, e.g., logic circuits, for executing program instructions. For example, the processor 720 may include interface circuits and processing circuits therein. The interface circuits may be configured to receive electronic signals from a bus 710, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 710.

The computing device 700 may further include program storage and data storage of different forms including, for example, a disk 770, a read only memory (ROM) 730, or a random access memory (RAM) 740, for storing various data files to be processed and/or transmitted by the computing device 700. The computing device 700 may also include program instructions stored in the ROM 730, RAM 740, and/or another type of non-transitory storage medium to be executed by the processor 720. The methods and/or processes of the present disclosure may be implemented as the program instructions. The computing device 700 may also include an I/O component 760, supporting input/output between the computer and other components. The computing device 700 may also receive programming and data via network communications.

Merely for illustration, only one processor is described in FIG. 7. Multiple processors are also contemplated, thus operations and/or steps performed by one processor as described in the present disclosure may also be jointly or separately performed by the multiple processors. For example, if in the present disclosure the processor of the computing device 700 executes both operation A and operation B, it should be understood that operation A and operation B may also be performed by two different CPUs and/or processors jointly or separately in the computing device 700 (e.g., the first processor executes operation A and the second processor executes operation B, or the first and second processors jointly execute operations A and B).

Figure 8:
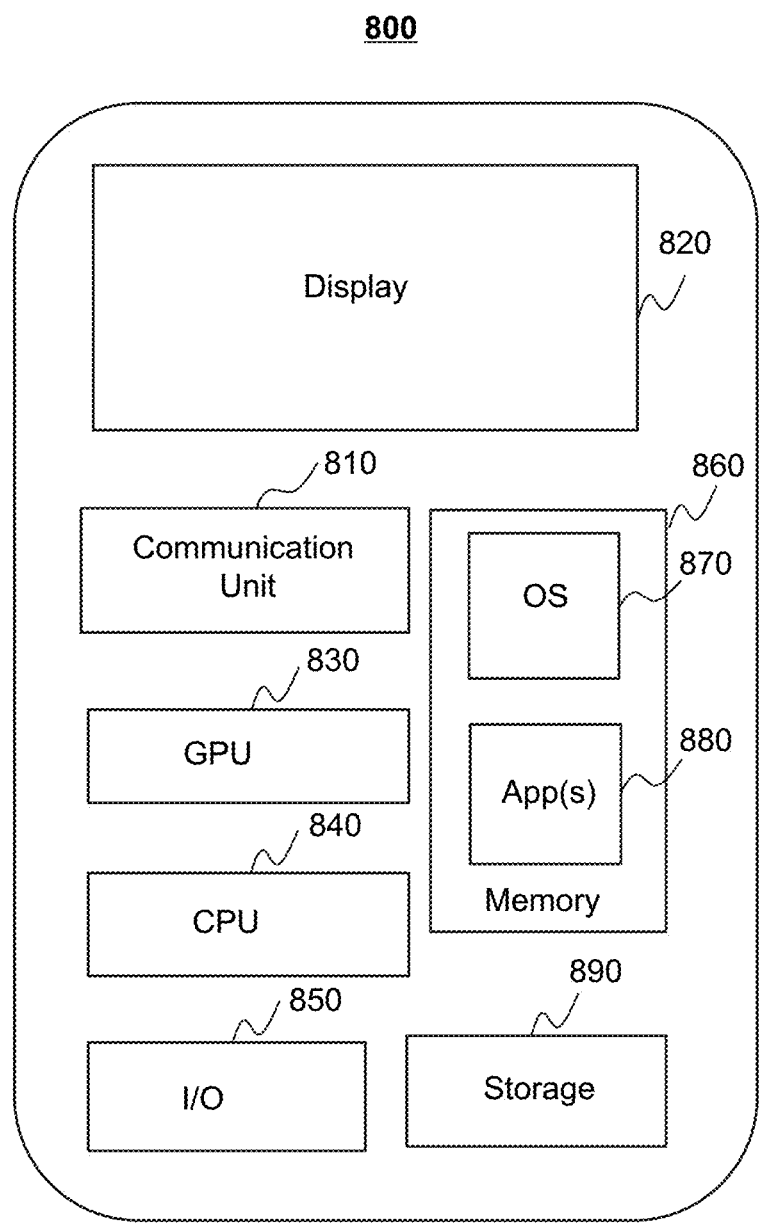
FIG. 8 is a schematic diagram illustrating exemplary hardware and/or software components of an exemplary mobile device according to some embodiments of the present disclosure.

FIG. 8 is a schematic diagram illustrating exemplary hardware and/or software components of an exemplary mobile device according to some embodiments of the present disclosure. In some embodiments, the user terminal 110 may be implemented on the mobile device 800.

As illustrated in FIG. 8, the mobile device 800 may include a communication platform 810, a display 820, a graphic processing unit (GPU) 830, a central processing unit (CPU) 840, an I/O 850, a memory 860, a mobile operating system (OS) 870, and a storage 890. In some embodiments, any other suitable component, including but not limited to a system bus or a controller (not shown), may also be included in the mobile device 800.

In some embodiments, the mobile operating system 870 (e.g., iOS™, Android™, Windows Phone™) and one or more applications 880 may be loaded into the memory 860 from the storage 890 in order to be executed by the CPU 840. The applications 880 may include a browser or any other suitable mobile app for receiving and rendering information in the speech dialogue processing system 100. User interactions with the information stream may be achieved via the I/O 850 and provided to the first processing device 120, the second processing device 130, and/or other components of the speech dialogue processing system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

The beneficial effects of the present disclosure may include but not limited to: (1) by merging phonetic symbol information, role information, dialect information, and/or emotion information of speech dialogue data, the accuracy of semantic understanding of the speech dialogue data can be improved; (2) when a plurality of vector representation sequences (e.g., a text vector representation sequence, a phonetic symbol vector representation sequence, a role vector representation sequence, a dialect vector representation sequence, an emotion vector representation sequence, a background text vector representation sequence) are inputted into a speech dialogue coding model, the plurality of vector sequences may be merged and transformed in various manners, which can integrate different functions of features embodied by the plurality of vector representation sequences; (3) in a training process of a speech dialogue coding model, the performance (e.g., the accuracy) of the speech dialogue coding model can be improved by a role prediction task, a keyword prediction task, and/or a sentence order prediction task; (4) a representation vector corresponding to the target speech dialogue data may be determined based on a trained speech dialogue coding model, and then a summary, an intention result, an answer, and/or a translation result of the target speech dialogue data may be determined based on the representation vector according to a corresponding model (e.g., a classification model, an intension classification model, a QA model, a translation model), which can improve the accuracy of speech dialogue data processing. It should be noted that different embodiments may have different beneficial effects. In different embodiments, the beneficial effects may be any one or a combination of the above beneficial effects, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method for processing speech dialogue implemented on a computing device having at least one processor and at least one storage device, the method comprising:
   obtaining target speech dialogue data;
   obtaining a text vector representation sequence, a phonetic symbol vector representation sequence, and a role vector representation sequence by performing a vector transformation on the target speech dialogue data based on a text embedding model, a phonetic symbol embedding model, and a role embedding model, respectively;
   determining a representation vector corresponding to the target speech dialogue data by inputting the text vector representation sequence, the phonetic symbol vector representation sequence, and the role vector representation sequence into a trained speech dialogue coding model;
   determining a summary of the target speech dialogue data by inputting the representation vector into a classification model; and
   generating an output utilizing the determined summary of the target speech dialogue data.

2. The method of claim 1, further comprising:
obtaining a sentence text of the summary of the target speech dialogue data; and
performing a grammatical correction operation on the sentence text.

3. The method of claim 1, wherein the text embedding model includes at least one of:
a word embedding sub-model configured to determine a word vector representation sequence of the target speech dialogue data;
a position embedding sub-model configured to determine a position vector representation sequence of the target speech dialogue data; and
a paragraph embedding sub-model configured to determine a paragraph vector representation sequence of the target speech dialogue data.

4. The method of claim 1, wherein the determining the representation vector corresponding to the target speech dialogue data includes:
obtaining at least one of a dialect vector representation sequence, an emotion vector representation sequence, or a background text vector representation sequence corresponding to the target speech dialogue data, wherein
the dialect vector representation sequence is determined by performing a vector transformation on the target speech dialogue data based on a dialect embedding model;
the emotion vector representation sequence is determined by performing a vector transformation on the target speech dialogue data based on an emotion embedding model; and
the background text vector representation sequence is determined by performing a vector transformation on a background text of the target speech dialogue data based on a background text embedding model; and
determining the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model.

5. The method of claim 1, wherein the speech dialogue coding model is determined according to a training process, the training process including:
obtaining sample speech dialogue data;
obtaining a text vector representation sequence, a phonetic symbol vector representation sequence, and a role vector representation sequence by performing a vector transformation on the sample speech dialogue data based on a text embedding model, a phonetic symbol embedding model, and a role embedding model, respectively; and
obtaining a pre-trained speech dialogue coding model by pre-training the speech dialogue coding model in a self-supervised learning manner based on the text vector representation sequence, the phonetic symbol vector representation sequence, and the role vector representation sequence.

6. The method of claim 5, wherein the training process further includes:
jointly pre-training the speech dialogue coding model and at least one of the text embedding model, the phonetic symbol embedding model, or the role embedding model.

7. The method of claim 5, wherein the pre-training the speech dialogue coding model in the self-supervised learning manner includes:
designating at least portion of at least one of the text vector representation sequence, the phonetic symbol vector representation sequence, or the role vector representation sequence as an annotation, the annotation including at least portion of elements in the role vector representation sequence.

8. The method of claim 7, wherein the annotation further includes one or more keywords in the text vector representation sequence.

9. The method of claim 7, wherein the annotation further includes an order of sentences embodied in the text vector representation sequence.

10. The method of claim 5, wherein the obtaining the pre-trained speech dialogue coding model by pre-training the speech dialogue coding model includes:
obtaining at least one of a dialect vector representation sequence, an emotion vector representation sequence, or a background text vector representation sequence corresponding to the sample speech dialogue data, wherein
the dialect vector representation sequence is determined by performing a vector transformation on the sample speech dialogue data based on a dialect embedding model;
the emotion vector representation sequence is determined by performing a vector transformation on the sample speech dialogue data based on an emotion embedding model; and
the background text vector representation sequence is determined by performing a vector transformation on a background text of the sample speech dialogue data based on a background text embedding model; and
obtaining the pre-trained speech dialogue coding model by pre-training the speech dialogue coding model in the self-supervised learning manner based on the text vector representation sequence, the phonetic symbol vector representation sequence, the role vector representation sequence, and at least one of the dialect vector representation sequence, the emotion vector representation sequence, or the background text vector representation sequence.

11. A system for processing speech dialogue, comprising:
at least one storage device including a set of instructions; and
at least one processor in communication with the at least one storage device, wherein when executing the set of instructions, the at least one processor is directed to cause the system to:
obtain target speech dialogue data;
obtain a text vector representation sequence, a phonetic symbol vector representation sequence, and a role vector representation sequence by performing a vector transformation on the target speech dialogue data based on a text embedding model, a phonetic symbol embedding model, and a role embedding model, respectively;

determine a representation vector corresponding to the target speech dialogue data by inputting the text vector representation sequence, the phonetic symbol vector representation sequence, and the role vector representation sequence into a trained speech dialogue coding model;

determine a summary of the target speech dialogue data by inputting the representation vector into a classification model; and generate an output utilizing the determined summary of the target speech dialogue data.

12. The system of claim 11, wherein the at least one processor is further directed to cause the system to:
obtain a sentence text of the summary of the target speech dialogue data; and
perform a grammatical correction operation on the sentence text.

13. The system of claim 11, wherein the text embedding model includes at least one of:
a word embedding sub-model configured to determine a word vector representation sequence of the target speech dialogue data;
a position embedding sub-model configured to determine a position vector representation sequence of the target speech dialogue data; and
a paragraph embedding sub-model configured to determine a paragraph vector representation sequence of the target speech dialogue data.

14. The system of claim 11, wherein to determine the representation vector corresponding to the target speech dialogue data, the at least one processor is further directed to cause the system to:
obtain at least one of a dialect vector representation sequence, an emotion vector representation sequence, or a background text vector representation sequence corresponding to the target speech dialogue data, wherein
the dialect vector representation sequence is determined by performing a vector transformation on the target speech dialogue data based on a dialect embedding model;
the emotion vector representation sequence is determined by performing a vector transformation on the target speech dialogue data based on an emotion embedding model; and
the background text vector representation sequence is determined by performing a vector transformation on a background text of the target speech dialogue data based on a background text embedding model; and
determine the representation vector corresponding to the target speech dialogue data by inputting the text vector representation sequence, the phonetic symbol vector representation sequence, the role vector representation sequence, and at least one of the dialect vector representation sequence, the emotion vector representation sequence, or the background text vector representation sequence into the trained speech dialogue coding model.

15. The system of claim 11, wherein the speech dialogue coding model is determined according to a training process, the training process including:
obtaining sample speech dialogue data;
obtaining a text vector representation sequence, a phonetic symbol vector representation sequence, and a role vector representation sequence by performing a vector transformation on the sample speech dialogue data based on a text embedding model, a phonetic symbol embedding model, and a role embedding model, respectively; and
obtaining a pre-trained speech dialogue coding model by pre-training the speech dialogue coding model in a self-supervised learning manner based on the text vector representation sequence, the phonetic symbol vector representation sequence, and the role vector representation sequence.

16. The system of claim 15, wherein the training process further includes:
jointly pre-training the speech dialogue coding model and at least one of the text embedding model, the phonetic symbol embedding model, or the role embedding model.

17. The system of claim 15, wherein the pre-training the speech dialogue coding model in the self-supervised learning manner includes:
designating at least portion of at least one of the text vector representation sequence, the phonetic symbol vector representation sequence, or the role vector representation sequence as an annotation, the annotation including at least portion of elements in the role vector representation sequence.

18. The system of claim 17, wherein the annotation further includes one or more keywords in the text vector representation sequence.

19. The system of claim 17, wherein the annotation further includes an order of sentences embodied in the text vector representation sequence.

20. A non-transitory computer readable medium, comprising at least one set of instructions, wherein when executed by at least one processor of a computing device, the at least one set of instructions cause the at least one processor to effectuate a method comprising:
obtaining target speech dialogue data;
obtaining a text vector representation sequence, a phonetic symbol vector representation sequence, and a role vector representation sequence by performing a vector transformation on the target speech dialogue data based on a text embedding model, a phonetic symbol embedding model, and a role embedding model, respectively;
determining a representation vector corresponding to the target speech dialogue data by inputting the text vector representation sequence, the phonetic symbol vector representation sequence, and the role vector representation sequence into a trained speech dialogue coding model;
determining a summary of the target speech dialogue data by inputting the representation vector into a classification model; and
generating an output utilizing the determined summary of the target speech dialogue data.

* * * * *